(12) United States Patent
Baek et al.

(10) Patent No.: US 9,357,526 B2
(45) Date of Patent: May 31, 2016

(54) DEVICE AND METHOD FOR PERFORMING DEVICE TO DEVICE COMMUNICATION IN WIRELESS COMMUNICATION SYSTEM

(71) Applicant: Samsung Electronics Co., Ltd., Suwon-si, Gyeonggi-do (KR)

(72) Inventors: Sang-Kyu Baek, Suwon-si (KR); Young-Bin Chang, Anyang-si (KR); Kyung-Kyu Kim, Suwon-si (KR); Hyun-Seok Ryu, Yongin-si (KR); Seung-Hoon Park, Seoul (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/254,323

(22) Filed: Apr. 16, 2014

(65) Prior Publication Data

US 2014/0307657 A1 Oct. 16, 2014

(30) Foreign Application Priority Data

Apr. 16, 2013 (KR) ........................ 10-2013-0041352

(51) Int. Cl.
*H04W 72/02* (2009.01)
*H04W 76/02* (2009.01)
*H04W 72/04* (2009.01)
*H04W 72/08* (2009.01)

(52) U.S. Cl.
CPC .......... *H04W 72/02* (2013.01); *H04W 72/0453* (2013.01); *H04W 72/082* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 7,899,073 B2 | 3/2011 | Laroia et al. | |
| 8,254,296 B1* | 8/2012 | Lambert | H04W 72/02 370/281 |
| 2009/0005094 A1* | 1/2009 | Lee | H04W 52/383 455/509 |
| 2011/0228666 A1* | 9/2011 | Barbieri | H04W 76/023 370/216 |
| 2011/0317569 A1* | 12/2011 | Kneckt | H04W 74/0833 370/252 |
| 2012/0071188 A1* | 3/2012 | Wang | H04W 16/14 455/509 |
| 2012/0134344 A1* | 5/2012 | Yu | H04W 72/14 370/336 |
| 2012/0182907 A1* | 7/2012 | Li | H04W 76/023 370/280 |
| 2012/0243431 A1* | 9/2012 | Chen | H04W 72/0406 370/252 |
| 2013/0022010 A1* | 1/2013 | Qianxi | H04L 5/0033 370/329 |

(Continued)

FOREIGN PATENT DOCUMENTS

WO 2011088619 A1 7/2011
WO 2011116815 A1 9/2011

(Continued)

*Primary Examiner* — Brian Roberts
(74) *Attorney, Agent, or Firm* — Jefferson IP Law, LLP

(57) ABSTRACT

A device and a method for performing Device to Device (D2D) communication in a wireless communication system are provided. The method includes transmitting information on a self-frequency band selected from all frequency bands for the D2D communication, to the second mobile station, receiving information on a counterpart-frequency band selected for the D2D communication, from the second mobile station, determining transmission and reception frequency bands to be used for the D2D communication, based on the information on the self-frequency band and the information on the counterpart-frequency band, transmitting data to the second mobile station in the determined transmission frequency band, and receiving data from the second mobile station in the determined reception frequency band.

4 Claims, 19 Drawing Sheets

(56) References Cited

U.S. PATENT DOCUMENTS

| | | | |
|---|---|---|---|
| 2013/0301438 A1* | 11/2013 | Li | H04W 76/048 370/252 |
| 2014/0094183 A1* | 4/2014 | Gao | H04W 72/048 455/450 |

FOREIGN PATENT DOCUMENTS

| | | |
|---|---|---|
| WO | 2011143496 A1 | 11/2011 |
| WO | 2011161560 A1 | 12/2011 |

* cited by examiner

DEVICE AND METHOD FOR PERFORMING DEVICE TO DEVICE COMMUNICATION IN WIRELESS COMMUNICATION SYSTEM

CROSS-REFERENCE TO RELATED APPLICATION(S)

This application claims the benefit under 35 U.S.C. §119(a) of a Korean patent application filed on Apr. 16, 2013 in the Korean Intellectual Property Office and assigned Serial No. 10-2013-0041352, the entire disclosure of which is hereby incorporated by reference.

TECHNICAL FIELD

The present disclosure relates to a device and a method for performing communication in a wireless communication system. More particularly, the present disclosure relates to a device and a method for performing Device to Device (D2D) communication in a wireless communication system.

BACKGROUND

In general, wireless communication is performed based on limited resources such as frequencies. Thus, the available resources (i.e., frequencies) have to be allocated in order to perform the wireless communication. During resource allocation, it is desirable that the frequencies be allocated in view of interference with other signals.

Considering the interference with other signals in allocating the resources for the wireless communication should be commonly employed for most wireless communication systems. As a representative example, base stations configuring a cellular network are arranged in view of interference with surrounding base stations, and frequencies used by the respective base stations are also allocated in consideration of collisions with frequencies used by the surrounding base stations. In addition, resources used for Device to Device (D2D) communication in cellular networks have to be allocated in light of collisions with frequencies used by base stations to which mobile stations belong.

For example, in a general procedure of allocating resources for the D2D communication, a mobile station monitors frequencies used in received signals. Then, the mobile station selects a frequency to use based on the monitoring results. At this time, reception signal strength obtained by the monitoring may be considered for the selection of the frequency. As an example, a frequency having the lowest reception signal strength may be selected. The reason for selecting such a frequency is because the frequency having the lowest reception signal strength may be predicted to cause the least interference. The mobile station can allocate or can be allocated the frequency for the D2D communication.

According to the above description, each of the two mobile stations that configure a link for the D2D communication selects a preferred frequency thereof, without considering a counterpart mobile station. Thus, it is unlikely that the frequency selected without considering the counterpart mobile station is optimal for the D2D communication. For example, assuming that a transmitting mobile station for the D2D communication transmits a discovery message by using the frequency selected by itself, but a receiving mobile station cannot use the selected frequency due to interference, the receiving mobile station may not receive the discovery message transmitted by the transmitting mobile station. If the discovery message is not received for such a reason, the receiving mobile station cannot recognize the transmitting mobile station, thereby making it impossible to perform the D2D communication there between. Accordingly, a need exists for an improved apparatus and method for allocating frequency resources for D2D communication in consideration of interference in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and a method for allocating frequency resources for Device to Device (D2D) communication in consideration of interference in a wireless communication system.

Another aspect of the present disclosure is to provide a device and a method in which a mobile station performing D2D communication in a wireless communication system selects a frequency to be used by itself in consideration of a frequency band that can be used by a counterpart mobile station.

In accordance with an aspect of the present disclosure, a method of transmitting, by a first mobile station, data through D2D communication with a second mobile station in a wireless communication system is provided. The method includes transmitting information on a self-frequency band selected from all frequency bands for the D2D communication, to the second mobile station, receiving information on a counterpart-frequency band selected for the D2D communication, from the second mobile station, determining transmission and reception frequency bands to be used for the D2D communication based on the information on the self-frequency band and the information on the counterpart-frequency band, transmitting data to the second mobile station in the determined transmission frequency band, and receiving data from the second mobile station in the determined reception frequency band.

In accordance with another aspect of the present disclosure, a method of transmitting, by a first mobile station, data through D2D communication with a second mobile station in a wireless communication system is provided. The method includes receiving information on a counterpart-frequency band selected from all frequency bands for the D2D communication from the second mobile station, selecting a self-frequency band to be used by the first mobile station for the D2D communication based on the received information of the counterpart-frequency band, transmitting information on the selected self-frequency band to the second mobile station, determining transmission/reception frequency bands to be used for the D2D communication based on the information on the counterpart-frequency band and the information on the self-frequency band, transmitting data to the second mobile station in the determined transmission frequency band, and receiving data from the second mobile station in the determined reception frequency band.

In accordance with another aspect of the present disclosure, a first mobile station for transmitting data through D2D communication with a second mobile station in a wireless communication system is provided. The first mobile station includes a transmitting unit configured to transmit information on a self-frequency band to the second mobile station and data to the second mobile station in a transmission frequency band, a receiving unit configured to receive information on a counterpart-frequency band selected by the second mobile station for the D2D communication and data from the second mobile station in a reception frequency band, and a controller configured to select the self-frequency band from all frequency bands for the D2D communication and determine the transmission frequency band and the reception frequency band which are to be used for the D2D communication based on the information on the self-frequency band and the information on the counterpart-frequency band.

In accordance with another aspect of the present disclosure, a first mobile station for transmitting data through D2D communication with a second mobile station in a wireless communication system is provided. The first mobile station includes a transmission unit configured to transmit information on a self-frequency band to the second mobile station and data to the second mobile station in a transmission frequency band, a receiving unit configured to receive information on a counterpart-frequency band selected by the second mobile station for the D2D communication and data from the second mobile station in a reception frequency band, and a controller configured to select the self-frequency band from all frequency bands for the D2D communication based on the received information on the counterpart-frequency band, and determine transmission and reception frequency bands to be used for the D2D communication based on the information on the counterpart-frequency band and the information on the self-frequency band.

As described above, according to various embodiments of the present disclosure, a mobile station can select an optimal frequency for D2D communication by exchanging information on the used frequencies with a counterpart mobile station to configure a link for the D2D communication in a wireless network, thereby making the D2D communication easier.

In addition, other effects obtained or expected by various embodiments of the present disclosure will be directly or implicitly disclosed in the detailed description of the various embodiments of the present disclosure. That is, various effects expected by various embodiments of the present disclosure will be disclosed in the detailed description provided below.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following detailed description, various embodiments for transmitting or receiving data through Device to Device (D2D) communication in a wireless network will be described. To this end, the two mobile stations to establish a link for the D2D communication in the wireless network should be prepared to allocate frequency resources to be used in consideration of a collision with frequency resources used within a cell in which they are located. Namely, interference information should be shared between the two mobile stations to establish the link for the D2D communication in the wireless network.

Hereinafter, detailed operations related to various embodiments of the present disclosure will be described with reference to the accompanying drawings.

Figure 1:
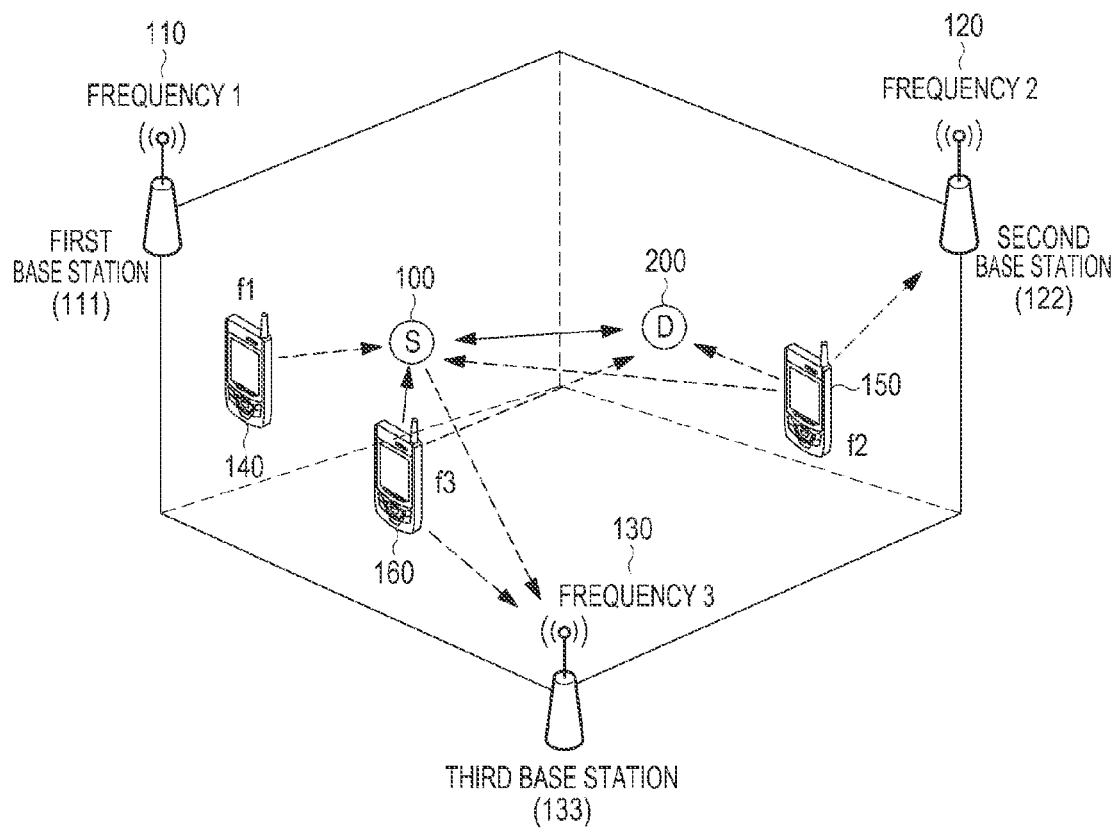
FIG. 1 illustrates a configuration of a wireless communication system according to an embodiment of the present disclosure.

FIG. 1 illustrates a configuration of a wireless communication system according to an embodiment of the present disclosure.

Referring to FIG. 1, it is assumed that the wireless communication system includes three base stations. The three base stations, namely, a first base station 111, a second base station 122, and a third base station 133 use different frequency bands. As an example, the first base station 111 uses a first frequency band 110 (hereinafter, referred to as "f1") for communication with mobile stations (e.g., mobile station 140) located within a service coverage thereof, the second base station 122 uses a second frequency band 120 (hereinafter, referred to as "f2") for communication with mobile stations (e.g., mobile station 150) located within a service coverage thereof, and the third base station 133 uses a third frequency band 130 (hereinafter, referred to as "f3") for communication with mobile stations (e.g., mobile station 160) located within a service coverage thereof.

It is assumed that, among the two mobile stations for the D2D communication, one mobile station, namely, a source station 100 (hereinafter, referred to as "mobile station S") is located within the service coverage of the first base station 111, and the other mobile station, namely, a destination station 200 (hereinafter, referred to as "mobile station D") is located within the service coverage of the second base station 122. That is, it is assumed that mobile station S (100) transmits/receives signals to/from the first base station 111 by using f1 (110), and mobile station D (200) transmits/receives signals to/from the second base station 122 by using f2 (120).

According to the above assumption, for the D2D communication, mobile station S (100) cannot use f1 (110) and mobile station D (200) cannot use f2 (120).

In performing the D2D communication between mobile station S (100) and mobile station D (200), if mobile station S (100) transmits signals by using f2 (120), signals transmitted from the second base station 122 interfere with the signals transmitted by mobile station S (100) so that it may be difficult for mobile station D (200) to normally receive the signals transmitted by mobile station S (100).

In addition, in performing the D2D communication between mobile station D (200) and mobile station S (100), if mobile station D (200) transmits signals by using f1 (110), signals transmitted from the first base station 111 interfere with the signals transmitted by mobile station D (200) so that it may be difficult for mobile station S (100) to normally receive the signals transmitted by mobile station D (200).

To address the above-mentioned problems, it is necessary to select a frequency, through which mobile station D (200) and mobile station S (100) can perform the D2D communication, in consideration of the interference. As an example, in order to perform the D2D communication in consideration of the interference, mobile station D (200) and mobile station S (100) have to be able to select a frequency other than f1 (110) and f2 (120). According to an embodiment of the present disclosure, mobile station D (200) and mobile station S (100) may select f3 (130).

However, mobile station S (100) does not recognize that mobile station D (200) cannot use f2 (120) for the D2D communication, and mobile station D (200) does not recognize that mobile station S (100) cannot use f1 (110) for the D2D communication.

Accordingly, in order to select the frequency for the D2D communication in consideration of the interference, mobile station S (100) and mobile station D (200) should be prepared to share each other's interference information. Here, the interference information may be frequency information unavailable for the D2D communication or frequency information available for the D2D communication.

Hereinafter, methods in which two mobile stations establishing a link for D2D communication share each other's interference information will be described with reference to various embodiments.

The following various embodiments may be largely divided into a method in which a mobile station to perform D2D communication predicts interference information of a counterpart mobile station and a method in which the mobile station directly provides interference information thereof to the counterpart mobile station by using a message.

Here, the method of predicting the interference information includes a method in which a mobile station uses a frequency unavailable for the D2D communication and a method in which the mobile station uses a frequency available for the D2D communication.

First, the method of using a frequency unavailable for the D2D communication will be described. Among the two mobile stations to perform the D2D communication, the first mobile station transmits signals (e.g., a discovery message) by using a frequency band being already used within a cell in which the first mobile station is located. The other mobile station, namely, a second mobile station monitors reception of the signals transmitted by the first mobile station while alternately selecting all the frequency bands which can be used in a wireless network. The second mobile station may recognize that the frequency band in which the signals have been received from the first mobile station corresponds to a frequency band which cannot be used by the first mobile station for the D2D communication.

For example, the source station of the D2D communication transmits a discovery message by using some frequency of frequency band f1 (110) being used within the cell in which the source station is located. The destination station of the D2D communication alternately selects all frequency bands f1 (110), f2 (120), and f3 (130), which can be used in the wireless network, at a predetermined time interval, and monitors whether the discovery message is received in the selected frequency band.

Through the monitoring, the destination station may receive the discovery message in frequency band f1 (110). Therefore, the destination station recognizes that the source station cannot use f1 (110) as the frequency band for the D2D communication.

Accordingly, since the cell in which the destination station is located uses frequency band f2 (120), the destination station may select remaining frequency band f3 (130) as the frequency band to be used for the D2D communication, and not frequency bands f1 (110) and f2 (120) which cannot be used by the destination station and the source station among all frequency bands f1 (110), f2 (120), and f3 (130) which are used in the wireless network.

The method of using an available frequency for the D2D communication will be described. Among the two mobile stations to perform the D2D communication, the first mobile station alternately selects the remaining frequency bands being used in the wireless network other than the frequency band being used already within the cell in which the first mobile station is located, and transmits signals (e.g., a discovery message) by using the alternately selected frequency bands. The other mobile station, namely, a second mobile station alternately selects the remaining frequency bands being used in the wireless network other than the frequency band being already used within the cell in which the second mobile station is located, and monitors whether the signals transmitted by the first mobile station are received in the alternately selected frequency band. The duration of a transmission interval in which the first mobile station transmits signals by using one frequency band alternately selected should be different from that of a monitoring interval in which the second mobile station monitors whether the signals are received by using one frequency band alternately selected. It is desirable that duration of a transmission interval by two frequency bands corresponds to duration of a monitoring interval by one frequency band, or duration of a transmission interval by one frequency band corresponds to duration of a monitoring interval by two frequency bands.

The second mobile station may recognize that the frequency band in which the signals have been received from the first mobile station corresponds to a frequency band which can be commonly used by the second mobile station and the first mobile station for the D2D communication.

For example, the source station to perform the D2D communication transmits a discovery message by alternately using some frequency of remaining frequency bands f2 (120) and f3 (130) other than frequency band f1 (110) which is being used within the cell in which the source station is located, among all frequency bands f1 (110), f2 (120), and f3 (130) which can be used in the wireless network. The destination station to perform the D2D communication monitors whether the discovery message is received, by alternately using some frequency of remaining frequency bands f1 (110) and f2 (130) other than frequency band f3 (120) which is being used within the cell in which the destination station is located, among all frequency bands f1 (110), f2 (120), and f3 (130) which can be used in the wireless network. When the source station selects the frequency band once, the destination station changes the frequency band at least once to select it, or when the source station changes the frequency band at least once to select it, the destination station selects the frequency band once.

Through the above-described monitoring, the destination station will receive the discovery message in frequency band f3 (130). Therefore, the destination station recognizes that the destination station and the source station can use f3 (130) as the frequency band for the D2D communication. Accordingly, the destination station may select recognized frequency band f3 (130) as the frequency band for the D2D communication.

In the method of directly providing interference information to the counterpart mobile station by using a message, each of the two mobile stations to perform the D2D communication provides, to the counterpart mobile station, information on the remaining frequency bands except for the frequency band being used within the cell in which it is located, among all the frequency bands which can be used in the wireless network. Accordingly, the two mobile stations to perform the D2D communication may share each other's interference information.

For example, the source station to perform the D2D communication transmits a discovery message containing information on one frequency band selected from remaining frequency bands f2 (120) and f3 (130) other than frequency band f1 (110) being used within the cell in which the source station is located, among all frequency bands f1 (110), f2 (120), and f3 (130) which can be used in the wireless network. The destination station to perform the D2D communication transmits a connection request message containing information on one frequency band selected from remaining frequency bands f1 (110) and f3 (130) other than frequency band f2 (120) being used within the cell in which the destination station is located, among all frequency bands f1 (110), f2 (120), and f3 (130) which can be used in the wireless network.

Thus, the source station may recognize which frequency band the destination station uses for the D2D communication, and the destination station may also recognize which frequency band the source station uses for the D2D communication.

Figure 2:
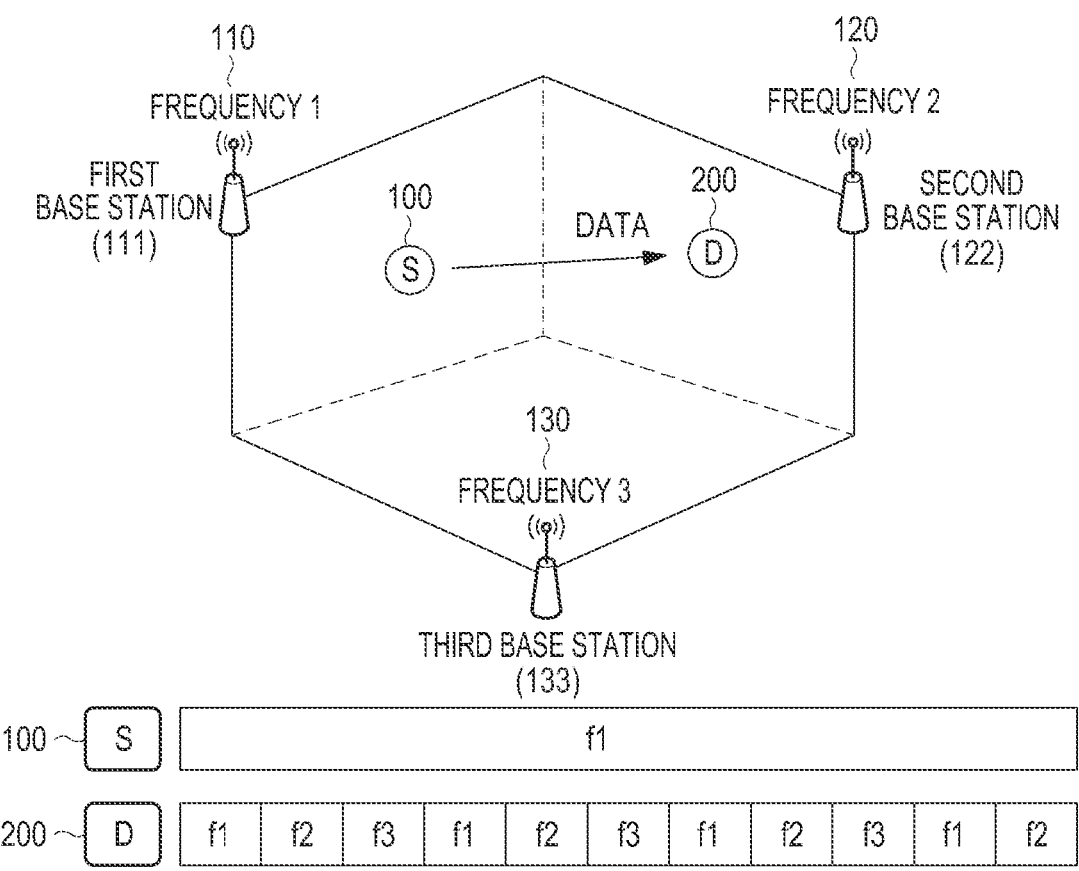
FIG. 2 illustrates a configuration of a wireless communication system according to a first embodiment of the present disclosure.

FIG. 2 illustrates a configuration of a wireless communication system according to a first embodiment of the present disclosure.

Referring to FIG. 2, mobile station S (100) is allocated some resources in frequency band f1 (110) from a first base station 111 using f1 (110). Thereafter, mobile station S (100) transmits an information message containing information thereof by using the allocated resources. A discovery message is an example of the information message. The information message has a smaller size relative to general data. Accordingly, the base station does not suffer significant throughput degradation of a cellular network due to the resource allocation.

Meanwhile, mobile station D (200) periodically or aperiodically changes and selects a frequency band to monitor for reception of the information message from all available frequency bands f1 (110), f2 (120), and f3 (130). Thereafter, mobile station D (200) receives the information message from mobile station S (100) through one of the available frequency bands. Thus, mobile station D (200) may receive interference information of mobile station S (100).

As an example, the frequency bands including f1 (110), f2 (120), and f3 (130) are illustrated in FIG. 2. However, the first embodiment of the present disclosure is not limited to the three frequency bands illustrated in FIG. 2.

Figure 3:
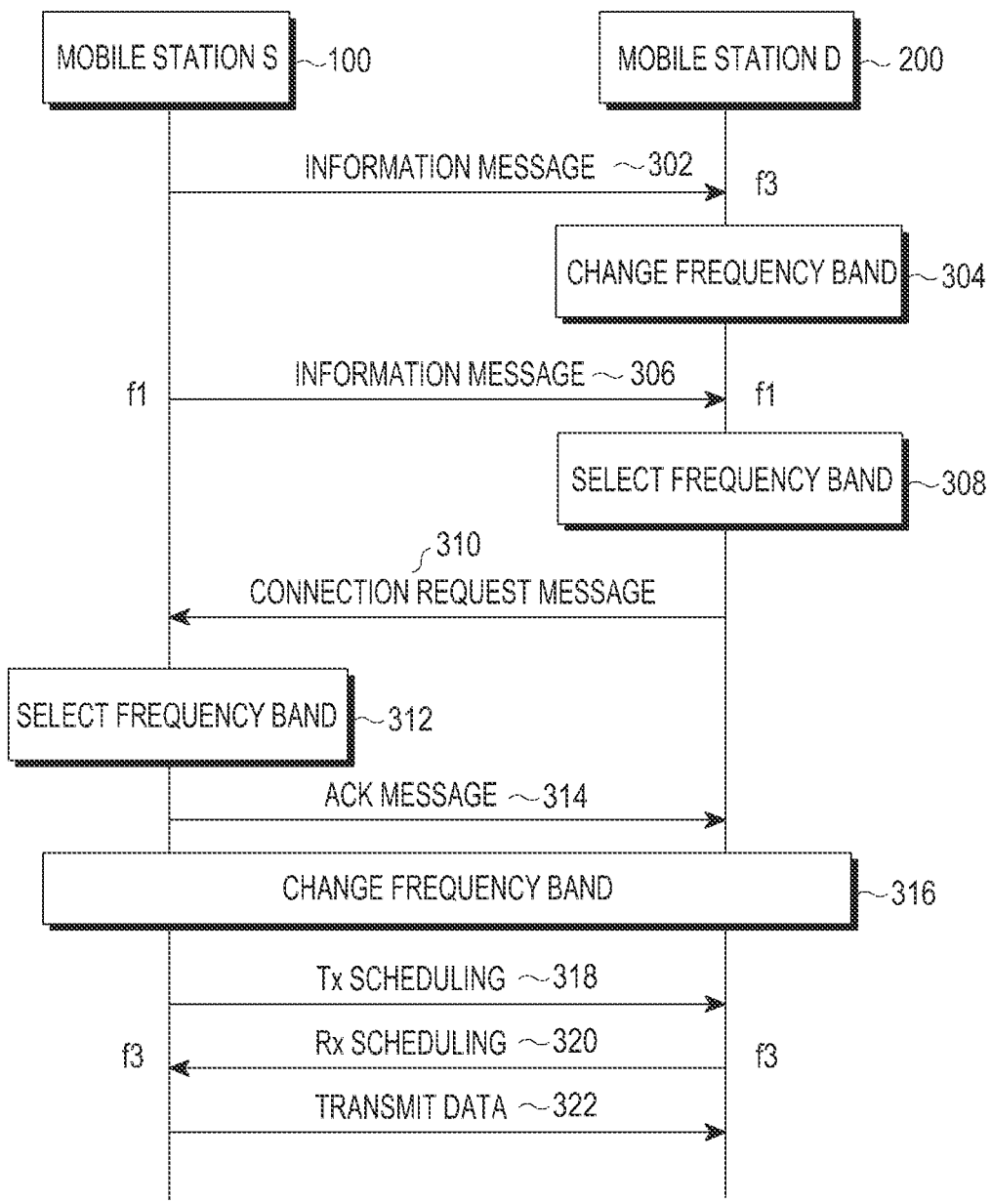
FIG. 3 is a signal flow diagram of a wireless communication system according to the first embodiment of the present disclosure.

FIG. 3 is a signal flow diagram of a wireless communication system according to the first embodiment of the present disclosure.

Referring to FIG. 3, mobile station S (100) transmits an information message to mobile station D (200) by using f1 (110) in operation 302. The information message may include frequency band information that can be used by mobile station S (100), an interference level for each of the frequency bands, a use frequency of a frequency band, the number of mobile stations using a frequency band, and the like. The information message may also include information representing that mobile station S (100) has to use f2 (120) and f3 (130) and not f1 (110).

Mobile station D (200) stands ready for reception of the information message for an interval configured in advance in f3 (130) among the plurality of frequency bands. When the information message is not received during the interval configured in advance, mobile station D (200) changes to the frequency band f1 (110) in operation 304.

Mobile station S (100) transmits the information message again using f1 (110) in operation 306. Mobile station S (100) continuously transmits the information message using f1 (110) until mobile station D (200) receives the information message.

Mobile station D (200) receives the information message transmitted from mobile station S (100). Thereafter, mobile station D (200) considers frequency interference and a band use frequency thereof based on the information message. Namely, in operation 308, mobile station D (200) determines that a frequency band in which D2D communication with mobile station S (100) has to be performed is f3 (130), and selects f3 (130).

In operation 310, mobile station D (200) transmits to mobile station S (100) a connection request message containing information for requesting performance of the D2D communication using f3 (130).

When receiving the connection request message, mobile station S (100) selects frequency band f3 (130) to perform the D2D communication with mobile station D (200) based on information of the connection request message in operation 312.

In operation 314, mobile station S (100) transmits to mobile station D (200) an acknowledgement message containing information representing that the D2D communication is to be performed by using f3 (130). The acknowledgement message may include reception ACK information for the connection request message and frequency usage information.

In operation 316, mobile station S (100) and mobile station D (200) change the frequency band for performing the D2D communication to f3 (130). Mobile station S (100) and mobile station D (200) perform Tx scheduling and Rx scheduling, respectively, in operation 318 and 320.

Thereafter, mobile station S (100) transmits data to mobile station D (200) based on the D2D communication in operation 322.

Figure 4:
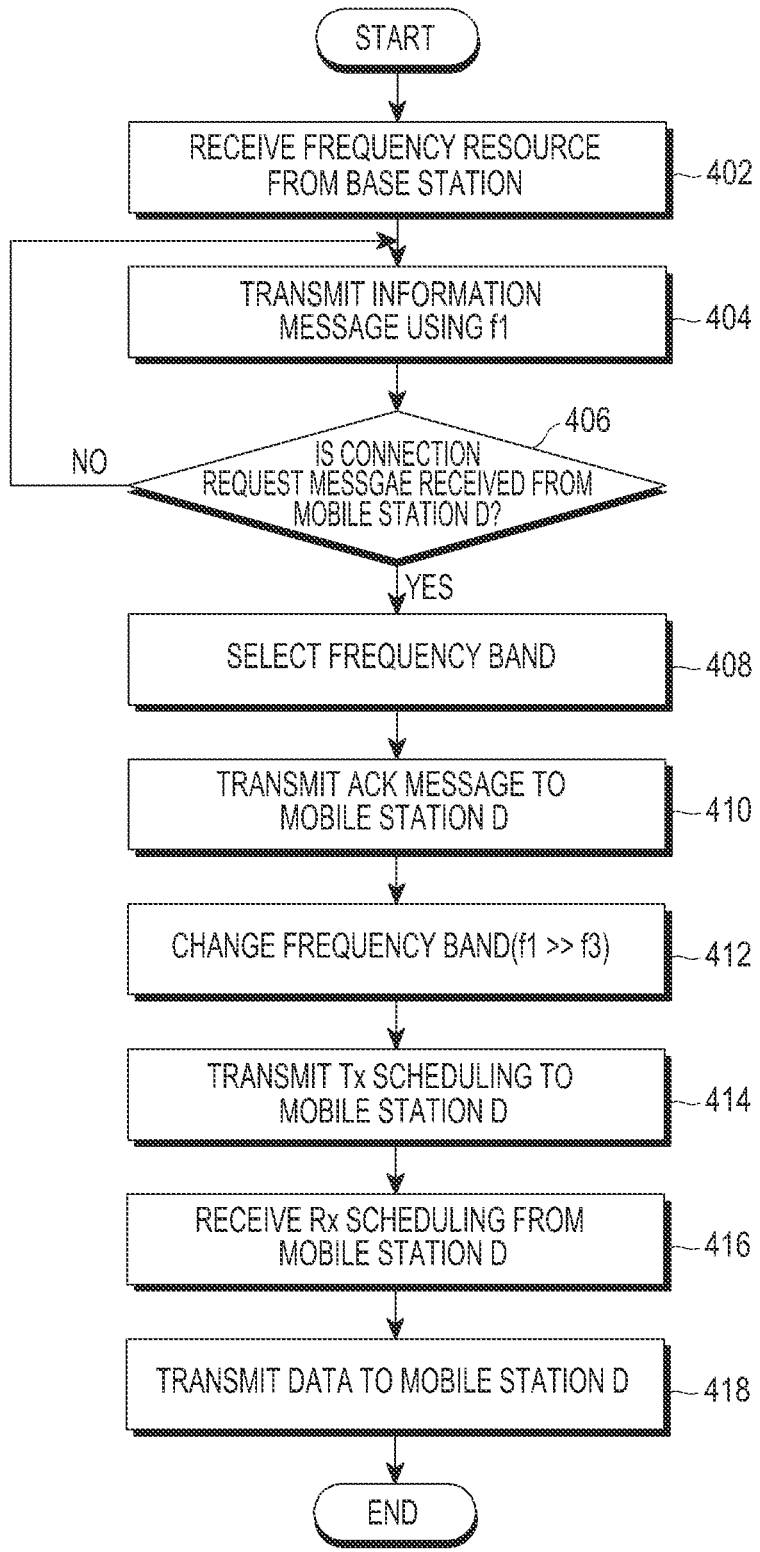
FIG. 4 is a flowchart illustrating operations of mobile station S according to the first embodiment of the present disclosure.

FIG. 4 is a flowchart illustrating operations of mobile station S according to the first embodiment of the present disclosure.

Referring to FIG. 4, mobile station S (100) is allocated frequency resources from the most contiguous base station in operation 402.

In operation 404, mobile station S (100) transmits the information message using the frequency resources in f1 (110), which have been allocated from the base station.

Although not illustrated in FIG. 4, mobile station S (100) may continuously transmit the information message until mobile station D (200) receives the information message.

Mobile station S (100) determines if the connection request message is received from mobile station D (200) in operation 406. At this time, the connection request message may include information for requesting mobile station D (200) to perform D2D communication using f3 (130). If the connection request message is received, mobile station S (100) selects the frequency band to perform the D2D communication with mobile station D (200) based on the information of the connection request message in operation 408. Namely, mobile station S (100) selects f3 (130) as the frequency band.

In operation 410, mobile station S (100) transmits, to mobile station D (200), the acknowledgement message containing information representing that the D2D communication is to be performed using f3 (130). The acknowledgement message may include reception ACK information for the connection request message and frequency usage information.

Mobile station S (100) changes the frequency band to f3 (130) in operation 412. Mobile station S (100) performs Tx scheduling and Rx scheduling together with mobile station D (200) in operations 414 and 416.

Thereafter, mobile station S (100) transmits data to mobile station D (200) in operation 418.

Figure 5:
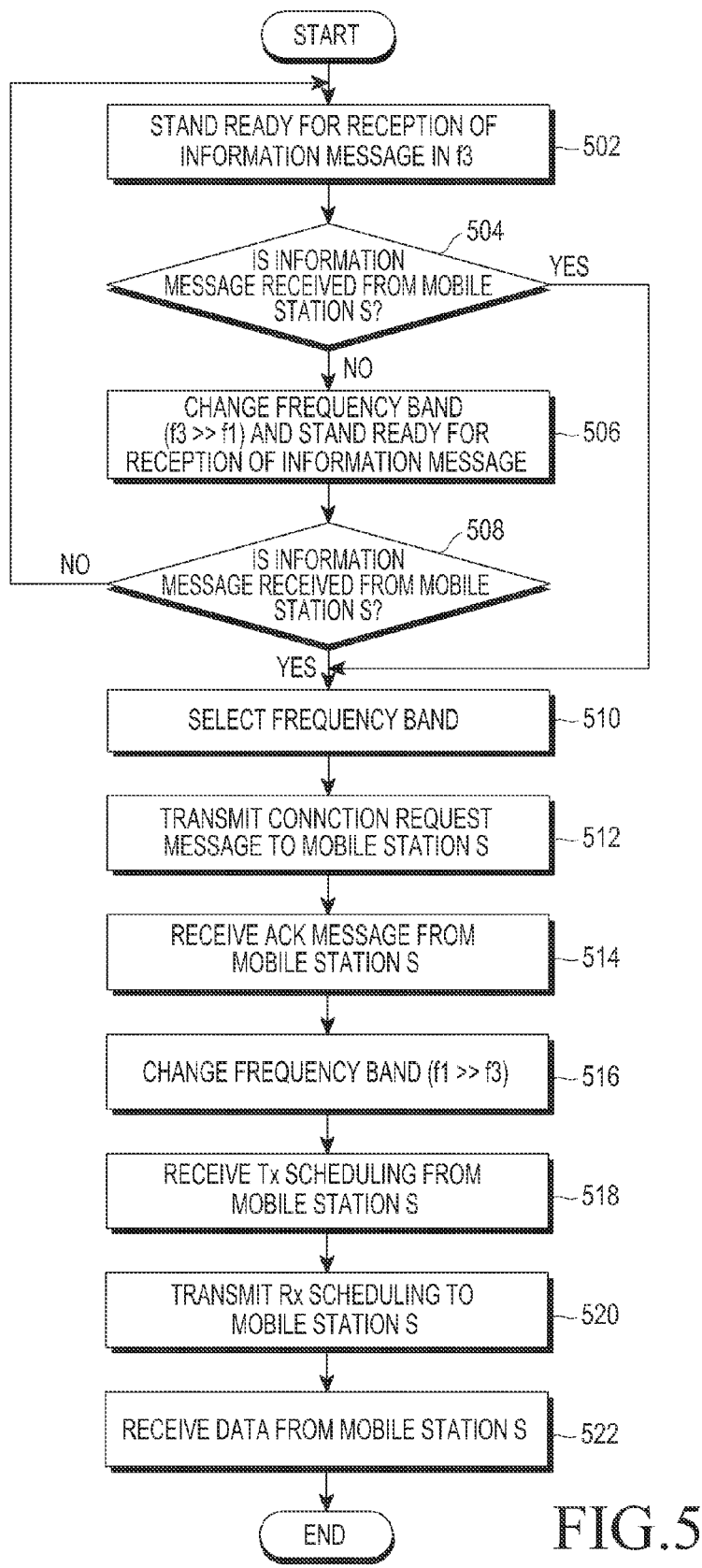
FIG. 5 is a flowchart illustrating operations of mobile station D according to the first embodiment of the present disclosure.

FIG. 5 is a flowchart illustrating operations of mobile station D according to the first embodiment of the present disclosure.

In operation 502, mobile station D (200) stands ready for reception of the information message for the interval configured in advance in frequency band f3 (130).

When it is determined in operation 504 that the information message has not been received, mobile station D (200) changes the frequency band from f3 (130) to f1 (110) in operation 506. Mobile station D (200) stands ready for the reception of the information message in f1 (110) for the interval configured in advance.

Mobile station D (200) determines if the information message from mobile station S (100) is received in operation 508. If the information message is received, mobile station D (200) considers the frequency interference and the band usage frequency thereof based on the information message. Namely, in operation 510, mobile station D (200) determines that the frequency band in which the D2D communication with mobile station S (100) has to be performed is f3 (130), and selects f3 (130).

In operation 512, mobile station D (200) transmits, to mobile station S (100), the connection request message containing the information for requesting performance of the D2D communication using f3 (130).

In operation 514, mobile station D (200) receives, from mobile station S (100), the acknowledgement message containing the reception ACK information for the connection request message.

In operation 516, mobile station D (200) changes the frequency band from f1 (110) to f3 (130).

Then, mobile station D (200) performs the Tx scheduling and the Rx scheduling in operations 518 and 520. Thereafter, mobile station D (200) receives the data from mobile station S (100) in operation 522.

Figure 6:
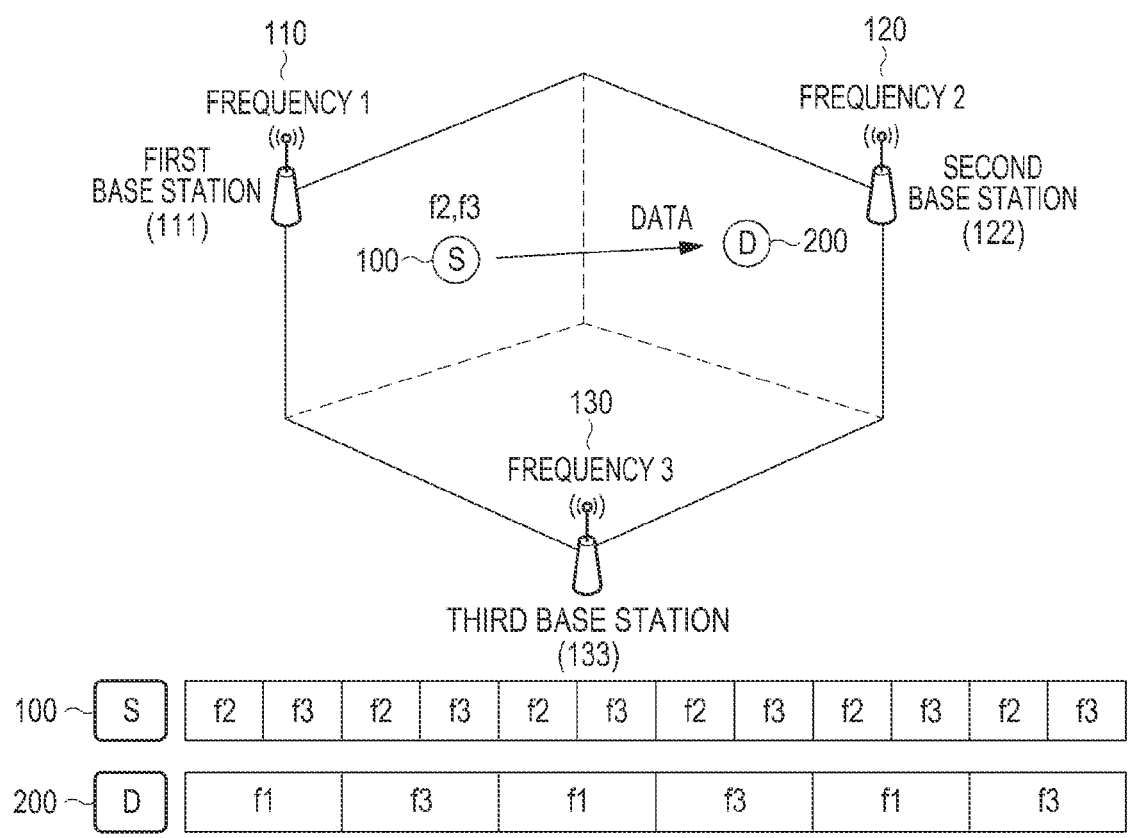
FIG. 6 illustrates a configuration of a wireless communication system according to a second embodiment of the present disclosure.

FIG. 6 illustrates a configuration of a wireless communication system according to a second embodiment of the present disclosure.

Referring to FIG. 6, mobile station S (100) is not allocated resources of frequency band f1 (110), which is being used by the first base station 111, but is allocated some resources of frequency bands f2 (120) and f3 (130), which are not being used by the first base station 111. Accordingly, mobile station S (100) transmits an information message to mobile station D (200) through a predetermined frequency band other than f1 (110). At this time, the predetermined frequency band is periodically or aperiodically changed. A predetermined number of frequency bands which will be periodically or aperiodically changed may be configured in advance.

Referring to FIG. 6, f2 (120) and f3 (130) are illustrated as examples of the possible frequency bands. However, the second embodiment of the present disclosure is not limited to the two frequency bands which are alternately used as illustrated in FIG. 6.

Mobile station D (200) receives the information message from the source station 100 through the predetermined frequency band. At this time, the predetermined frequency band used for receiving the information message may be a frequency band used by the base station to which mobile station D (200) belongs or a frequency band different from that used by the base station.

As an example, assuming that frequency bands f1 (110), f2 (120), and f3 (130) are used for direct communication and frequency band f2 (120) is used by the second base station 122 to which mobile station D (200) belongs, it is desirable that mobile station D (200) alternately selects and uses f1 (110) and f3 (130).

Thereafter, mobile station D (200) receives the information message. Accordingly, mobile station D (200) may receive interference information of mobile station S (100).

When a frequency band changing period of mobile station S (100) is identical to that of mobile station D (200), it may be difficult for mobile station D (200) to receive the information message. Therefore, in the second embodiment of the present disclosure, the frequency band changing period of mobile station D (200) may be changed to be integer times (e.g., twice) as long as that of mobile station S (100).

In the second embodiment, the frequency band changing period of mobile station D (200) is illustrated to be twice as long as that of mobile station S (100). However, the second embodiment of the present disclosure is not limited thereto.

Figure 7:
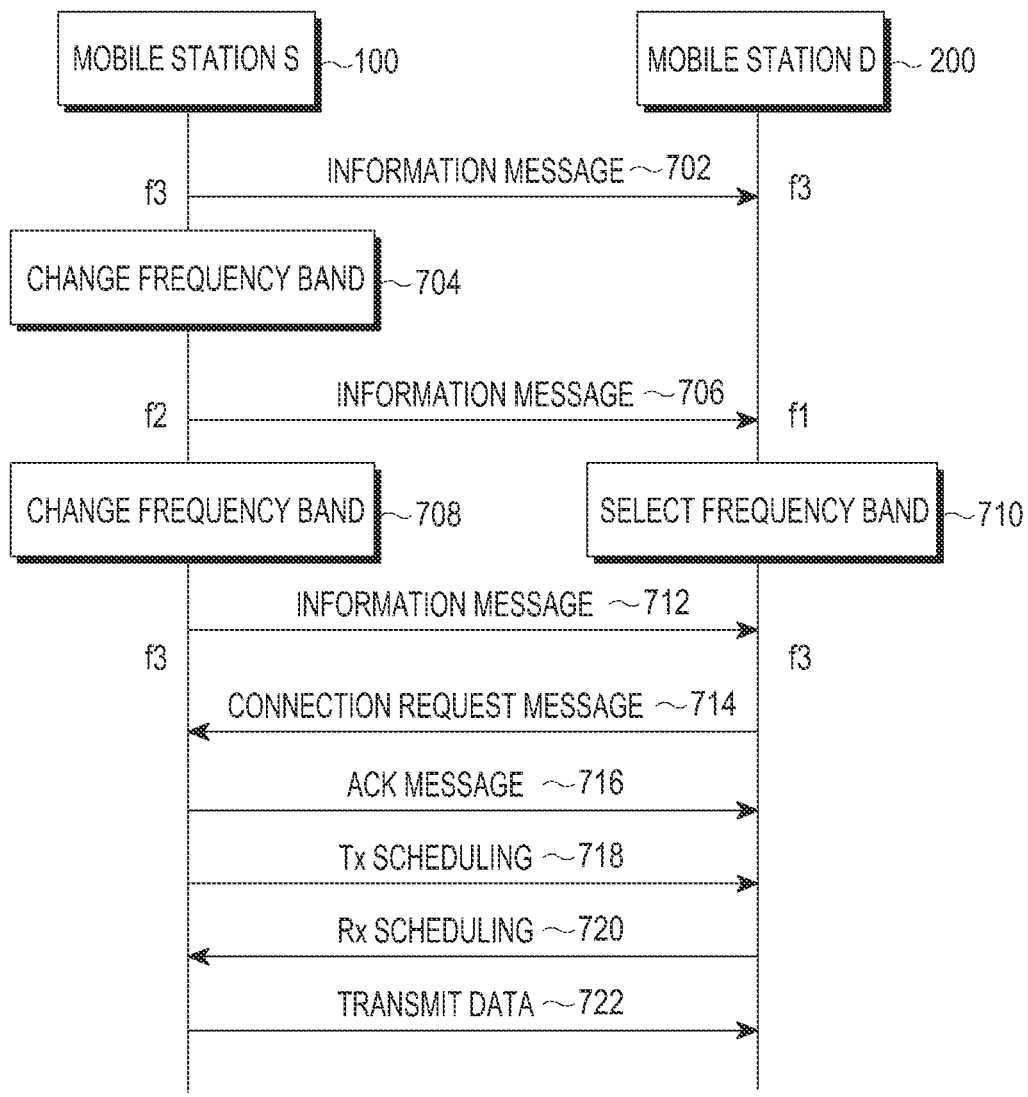
FIG. 7 is a signal flow diagram of a wireless communication system according to the second embodiment of the present disclosure.

FIG. 7 is a signal flow diagram of the wireless communication system according to the second embodiment of the present disclosure.

Referring to FIG. 7, mobile station S (100) transmits an information message using f3 (130) in operation 702.

When not receiving an acknowledgement for the information message for an interval configured in advance, mobile station S (100) changes the frequency band to f2 (120) in operation 704.

Thereafter, mobile station S (100) transmits the information message using f2 (120) in operation 706.

When not receiving an acknowledgement for the information message for an interval configured in advance, mobile station S (100) changes the frequency band to f3 (130) in operation 708. Mobile station S (100) may also periodically or aperiodically continue to change the frequency band until receiving the acknowledgement for the information message.

As illustrated in FIG. 6, while mobile station S (100) changes the period of the frequency band two times, mobile station D (200) changes the frequency band once.

When not receiving the information message from mobile station S (100) in f1 (110), mobile station D (200) changes the frequency band to f3 (130) in operation 710.

Mobile station S (100) transmits the information message again using f3 (130) in operation 712.

Mobile station D (200) receives the information message from mobile station S (100). Accordingly, in operation 714, mobile station D (200) transmits, to mobile station S (100), a connection request message in response to the information message. The connection request message may include information representing that the D2D communication is to be performed in f3 (130) through which the information message has been received.

When receiving the connection request message, mobile station S (100) transmits, to mobile station D (200), an acknowledgement message in response to the connection request message in operation 716. The acknowledgement message may include reception ACK information for the connection request message and frequency usage information.

Thereafter, mobile station S (100) and mobile station D (200) perform Tx scheduling and Rx scheduling, respectively, in operations 718 and 720, and mobile station S (100) transmits data to mobile station D (200) in operation 722.

Figure 8:
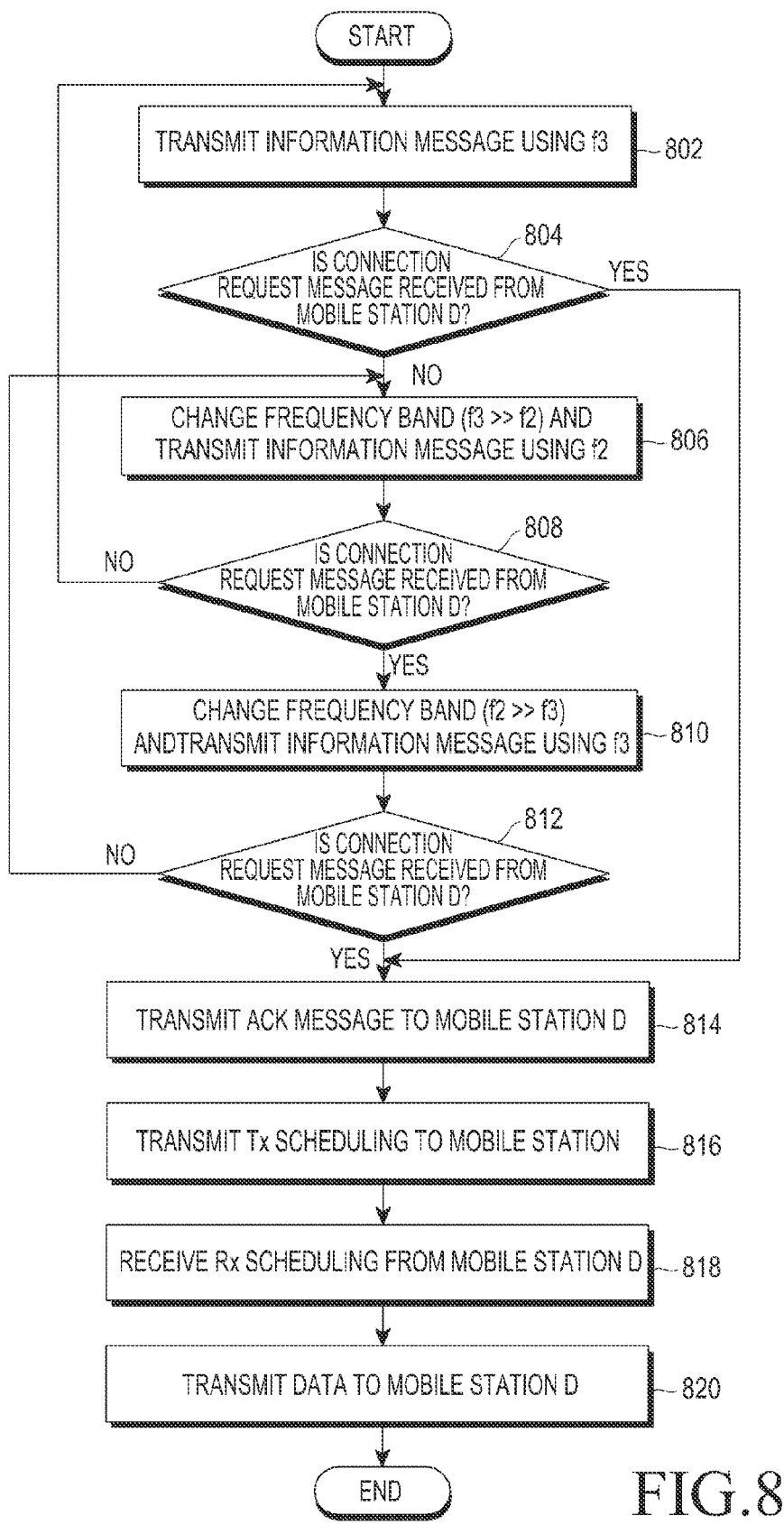
FIG. 8 is a flowchart illustrating operations of mobile station S according to the second embodiment of the present disclosure.

FIG. 8 is a flowchart illustrating operations of mobile station S according to the second embodiment of the present disclosure.

Referring to FIG. 8, mobile station S (100) transmits the information message using f3 (130) in operation 802.

When it is determined in operation 804 that an acknowledgement for the information message has not been received for an interval configured in advance, mobile station S (100) changes the frequency band to f2 (120).

Thereafter, mobile station S (100) transmits the information message again using f2 (120) in operation 806.

When it is determined in operation 808 that an acknowledgement for the information message has not been received for an interval configured in advance, mobile station S (100) changes the frequency band to f3 (130) again.

Mobile station S (100) transmits the information message again using f3 (130) in operation 810. Mobile station S (100) may continue to transmit the information message by periodically or aperiodically changing the frequency band until receiving the acknowledgement for the information message.

When it is determined in operation 812 that the connection request message has been received, mobile station S (100) transmits, to mobile station D (200), the acknowledgement message in response to the connection request message in operation 814. The acknowledgement message may include reception ACK information for the connection request message and frequency usage information.

Thereafter, mobile station S (100) and mobile station D (200) perform Tx scheduling and Rx scheduling, respectively, in operations 816 and 818, and mobile station S (100) transmits data to mobile station D (200) in operation 820.

Figure 9:
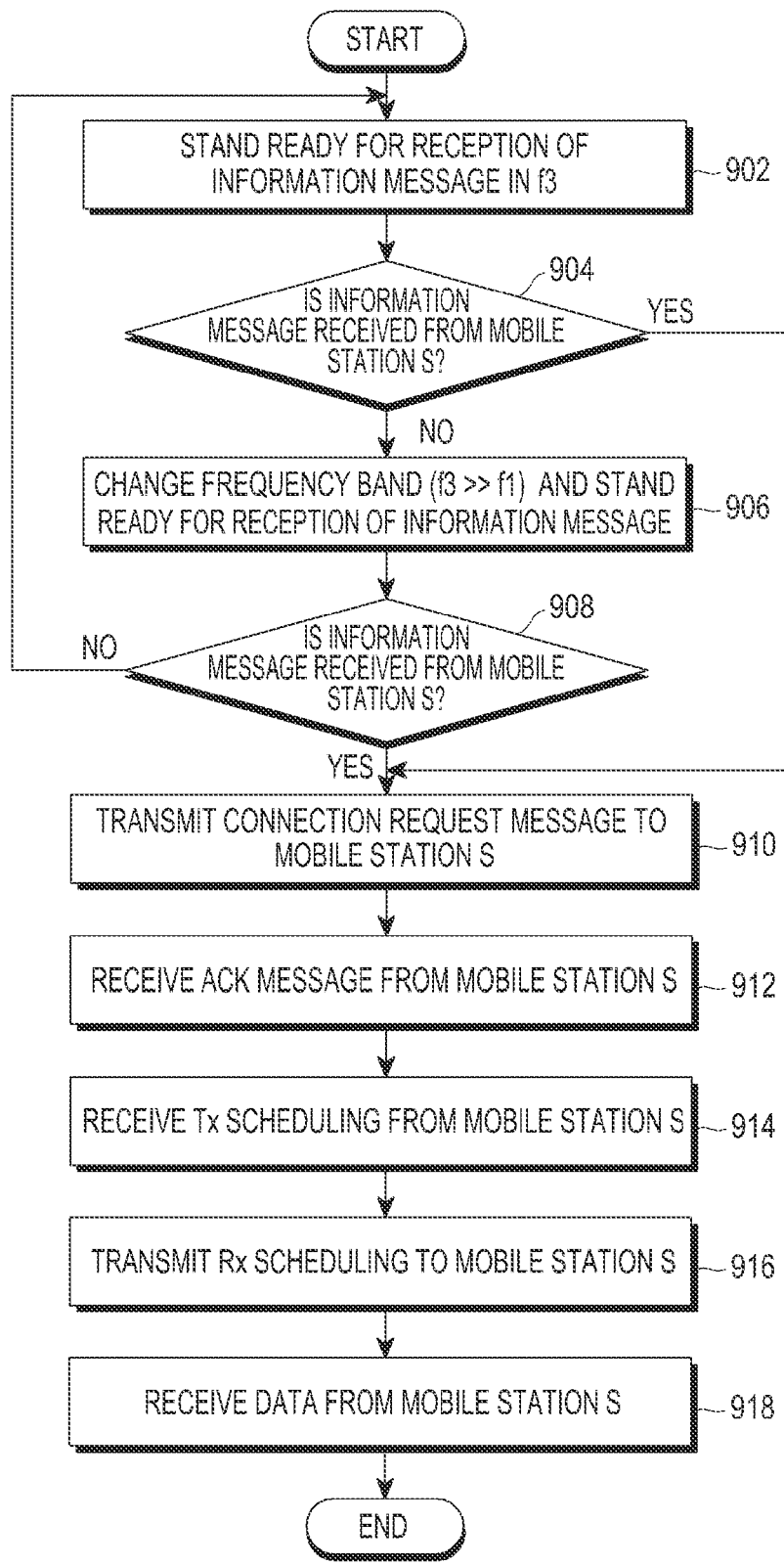
FIG. 9 is a flowchart illustrating operations of mobile station D according to the second embodiment of the present disclosure.

FIG. 9 is a flowchart illustrating operations of mobile station D according to the second embodiment of the present disclosure.

Referring to FIG. 9, in operation 902, mobile station D (200) stands ready for reception of the information message for an interval configured in advance by using frequency band f3 (130).

When it is determined in operation 904 that the information message has not been received, mobile station D (200) changes the frequency band from f3 (130) to f1 (110) in operation 906. Mobile station D (200) stands ready for the reception of the information message in f1 (110) for an interval configured in advance.

Mobile station D (200) receives the information message from mobile station S (100) in operation 908. Accordingly, in operation 910, mobile station D (200) transmits, to mobile station S (100), the connection request message in response to the information message. The connection request message may include information representing that the D2D communication is to be performed in f3 (130) through which the information message has been received.

Mobile station D (200) receives the acknowledgement message for the connection request message from mobile station S (100) in operation 912.

Thereafter, mobile station S (100) and mobile station D (200) perform Tx scheduling and Rx scheduling, respectively, in operations 914 and 916, and mobile station D (200) receives data from mobile station S (100) in operation 918.

Figure 10:
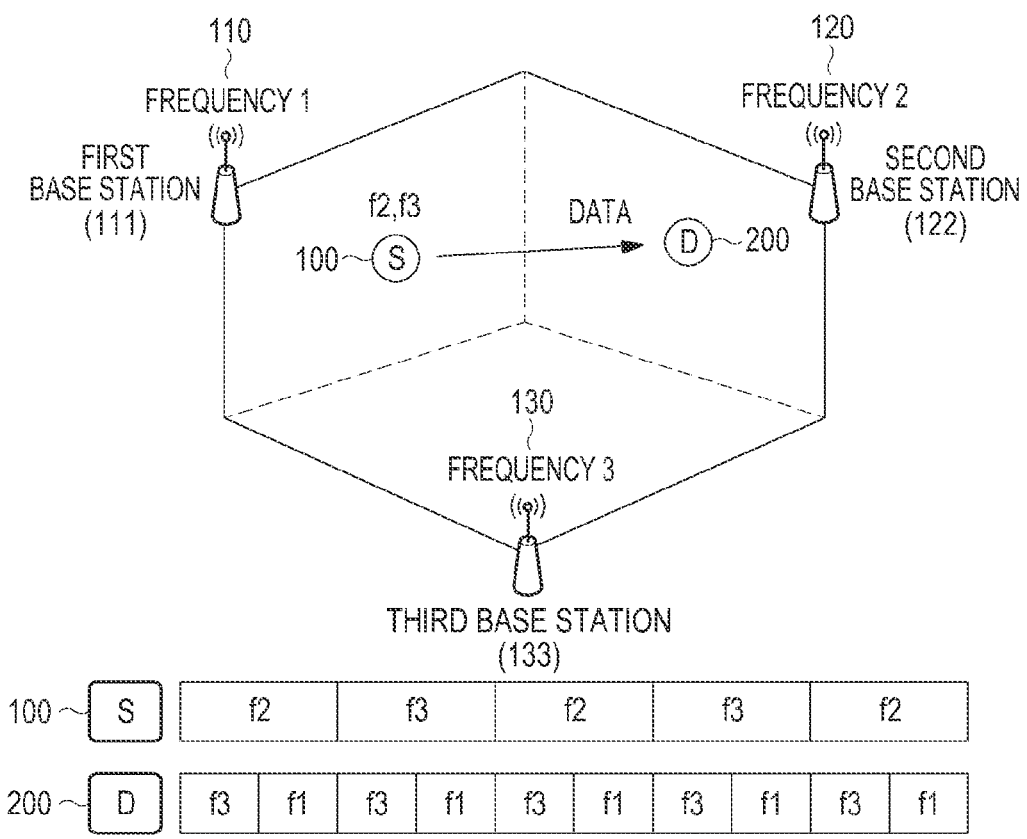
FIG. 10 illustrates a configuration of a wireless communication system according to a third embodiment of the present disclosure.

FIG. 10 illustrates a configuration of a wireless communication system according to a third embodiment of the present disclosure.

Referring to FIG. 10, mobile station S (100) is not allocated resources of frequency band f1 (110), which is being used by the first base station 111, but is allocated some resources of at least one of frequency bands f2 (120) and f3 (130) which are not being used by the first base station 111. Accordingly, mobile station S (100) transmits an information message to mobile station D (200) through a predetermined frequency band other than f1 (110). At this time, the predetermined frequency band is periodically or aperiodically changed. A predetermined number of frequency bands which will be periodically or aperiodically changed may be configured in advance. In FIG. 10, f2 (120) and f3 (130) are illustrated as examples of possible frequency bands. However, the third embodiment of the present disclosure is not limited to the two frequency bands which are alternately used as illustrated in FIG. 10.

Mobile station D (200) receives the information message from the source station 100 through the predetermined frequency band. At this time, the predetermined frequency band used for receiving the information message may be a frequency band used by the second base station 122 to which mobile station D (200) belongs or a frequency band different from that used by the base station.

As an example, assuming that frequency bands f1 (110), f2 (120), and f3 (130) are used for D2D communication and frequency band f2 (120) is used by the second base station 122 to which mobile station D (200) belongs, it is desirable that mobile station D (200) alternately selects and uses f1 (110) and f3 (130).

Thereafter, mobile station D (200) receives the information message. Accordingly, mobile station D (200) may receive interference information of mobile station S (100).

When a frequency band changing period of mobile station S (100) is identical to that of mobile station D (200), it may be difficult for mobile station D (200) to receive the information message. Therefore, in the third embodiment of the present disclosure, the frequency band changing period of mobile station D (200) may be configured to be integer times (twice) as large as that of mobile station S (100).

In the third embodiment, it is assumed that the frequency band changing period of mobile station S (100) is twice as large as that of mobile station D (200). However, the third embodiment of the present disclosure does not necessarily have to be limited thereto.

Figure 11:
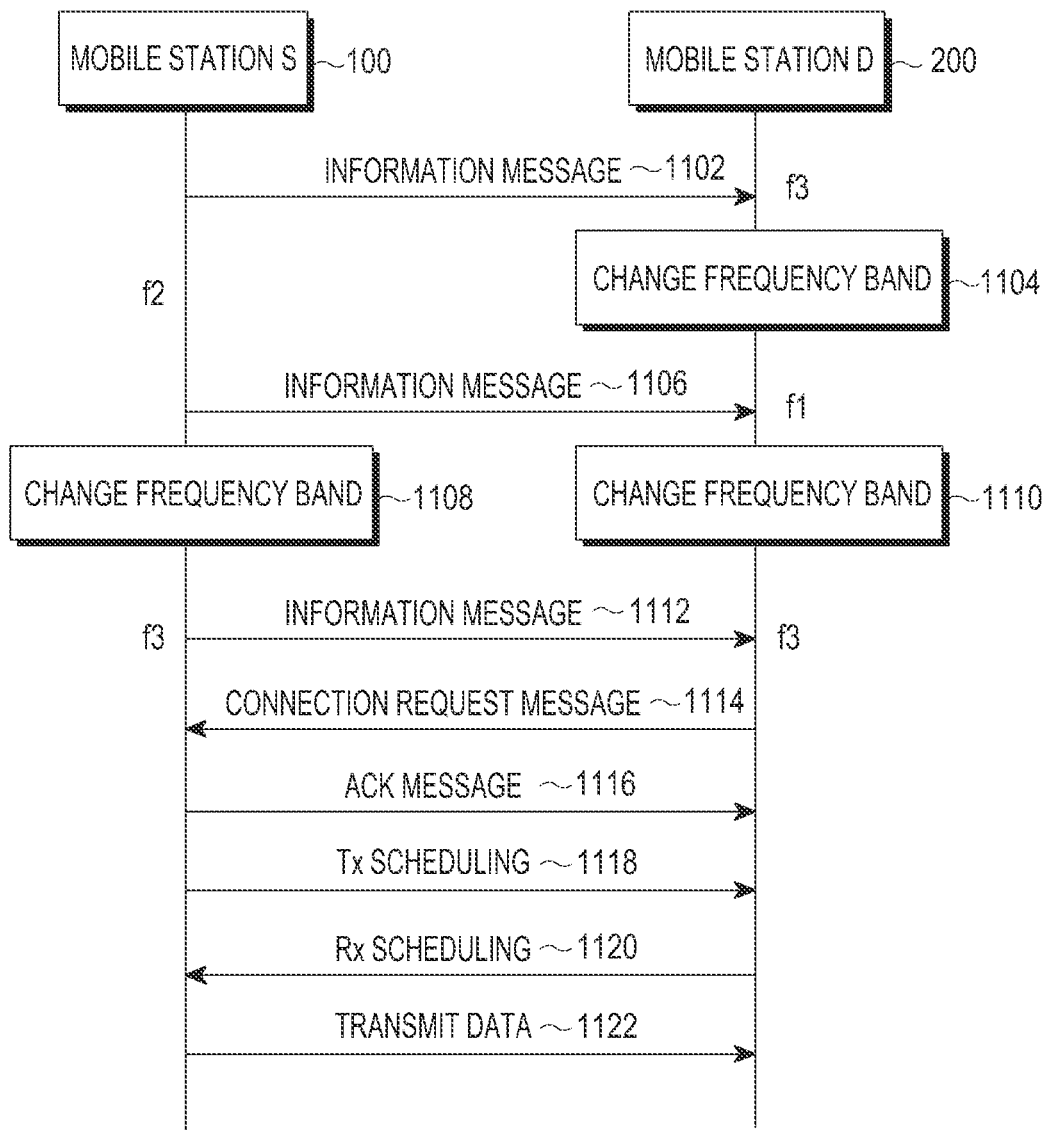
FIG. 11 is a signal flow diagram of a wireless communication system according to the third embodiment of the present disclosure.

FIG. 11 is a signal flow diagram of a wireless communication system according to the third embodiment of the present disclosure.

Referring to FIG. 11, mobile station S (100) transmits an information message using f2 (120) in operation 1102.

When not receiving the information message from mobile station S (100) through f3 (130), mobile station D (200) changes the frequency band from f3 (130) to f1 (110) in operation 1104.

As illustrated in FIG. 10, while mobile station S (100) is maintained in one frequency band, mobile station D (200) monitors whether the information message is received in the two frequency bands, by changing the frequency band once. If eight frequency bands can be used in the wireless network, mobile station D (200) may monitor whether the information message is received in seven frequency bands, by changing the frequency band six times in an interval in which mobile station S (100) is maintained in one frequency band.

Generalizing this, when n frequency bands can be used in the wireless network, mobile station D (200) performs monitoring for n−1 frequency bands, by changing the frequency band n−2 times in an interval in which mobile station S (100) is maintained in one frequency band. Otherwise, if n frequency bands can be used in the wireless network, mobile station D (200) may also perform monitoring for n−1 frequency bands, by changing the frequency band n−2 times in an interval in which mobile station S (100) changes the frequency band once. As the number of frequency bands which mobile station S (100) has to monitor is increased as described above, mobile station S (100), in response, may target the interval in which the frequency band changing frequency is increased.

Mobile station S (100) transmits the information message again using f2 (120) in operation 1106.

When not receiving an acknowledgement for the information message for an interval configured in advance, mobile station S (100) changes the frequency band to f3 (130) in operation 1108. Mobile station S (100) may also periodically or aperiodically continue to change the frequency band until receiving the acknowledgement for the information message.

When not receiving the information message from mobile station S (100) in f3 (130), mobile station D (200) changes the frequency band to f1 (110) in operation 1110.

Mobile station S (100) modifies the frequency band from f2 (120) to f3 (130) in operation 1112, and transmits the information message again using f3 (130) according to the modification.

Mobile station D (200) receives the information message from mobile station S (100). Accordingly, in operation 1114, mobile station D (200) transmits, to mobile station S (100), a connection request message in response to the information message. The connection request message may include information representing that the D2D communication is to be performed in f3 (130) through which the information message has been received.

When receiving the connection request message, mobile station S (100) transmits, to mobile station D (200), an acknowledgement message in response to the connection request message in operation 1116. The acknowledgement message may include reception ACK information for the connection request message and frequency usage information.

Thereafter, mobile station S (100) and mobile station D (200) perform Tx scheduling and Rx scheduling, respectively, in operations 1118 and 1120, and mobile station S (100) transmits data to mobile station D (200) in operation 1122.

Figure 12:
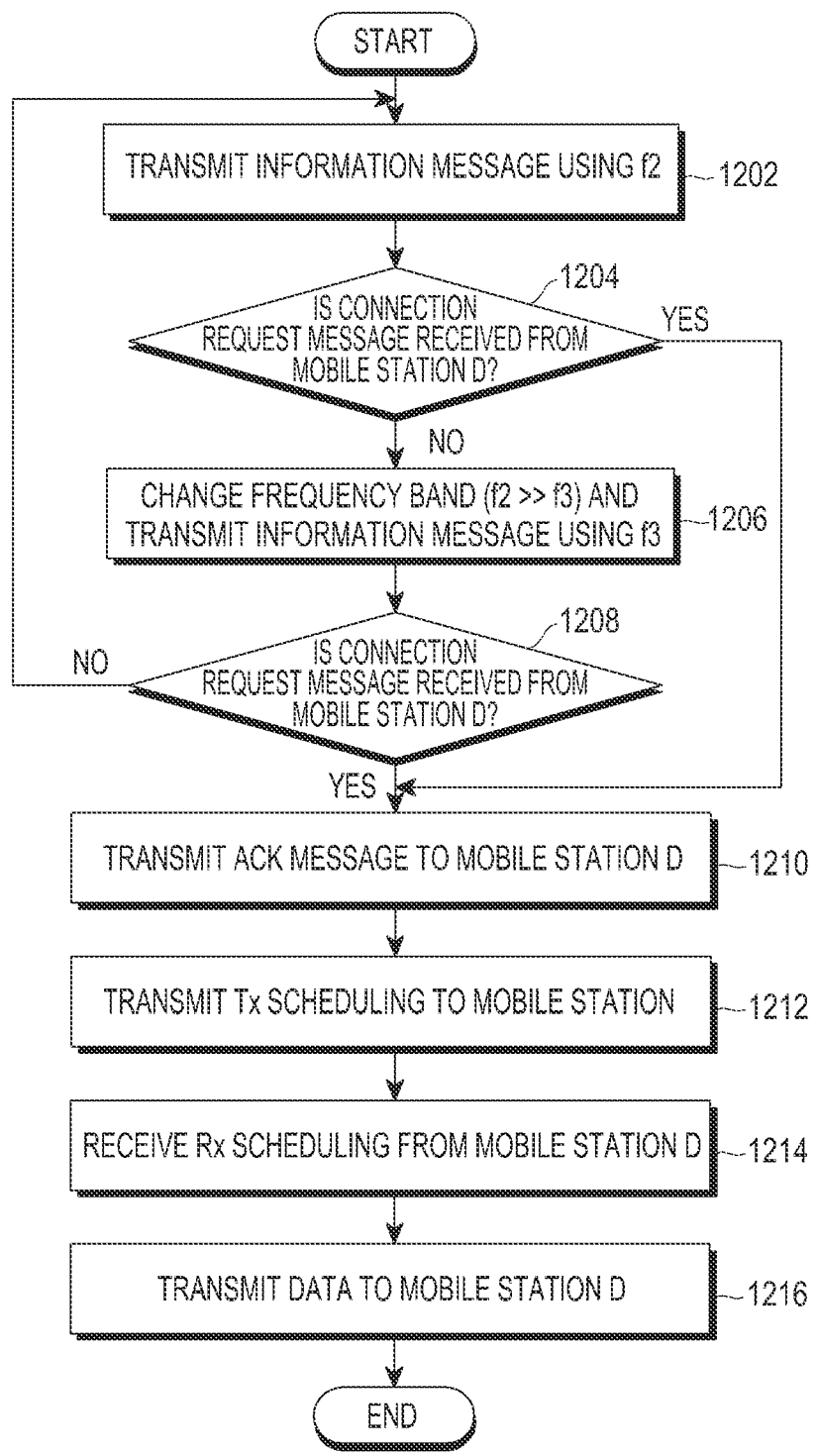
FIG. 12 is a flowchart illustrating operations of mobile station S according to the third embodiment of the present disclosure.

FIG. 12 is a flowchart illustrating operations of mobile station S according to the third embodiment of the present disclosure.

Referring to FIG. 12, mobile station S (100) transmits the information message by using f2 (120) in operation 1202.

When it is determined in operation 1204 that an acknowledgement for the information message has not been received for an interval configured in advance, mobile station S (100) changes the frequency band to f3 (130).

Thereafter, mobile station S (100) transmits the information message again using f3 (130) in operation 1206.

Mobile station S (100) may periodically or aperiodically continue to change the frequency band through which the information message will be transmitted, until receiving the acknowledgement for the information message.

In operation 1208, mobile station S (100) receives the connection request message from mobile station D (200) in response to the information message.

In operation 1210, mobile station S (100) transmits to mobile station D (200) the acknowledgement message in response to the connection request message. The acknowledgement message may include reception ACK information for the connection request message and frequency usage information.

Thereafter, mobile station S (100) and mobile station D (200) perform Tx scheduling and Rx scheduling, respectively, in operations 1212 and 1214, and mobile station S (100) transmits data to mobile station D (200) in operation 1216.

Figure 13A:
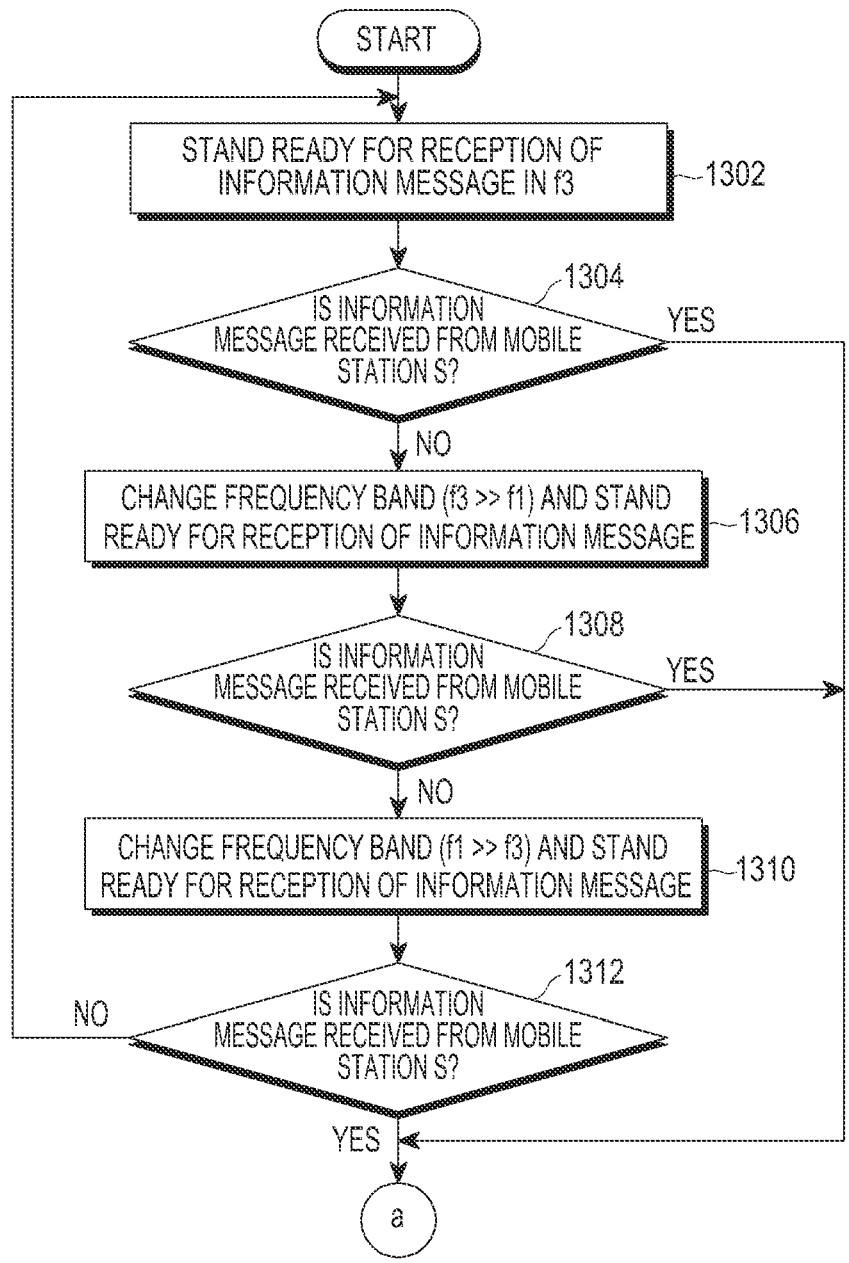
FIGS. 13A and 13B are flowcharts illustrating operations of mobile station D according to the third embodiment of the present disclosure.
Figure 13B:
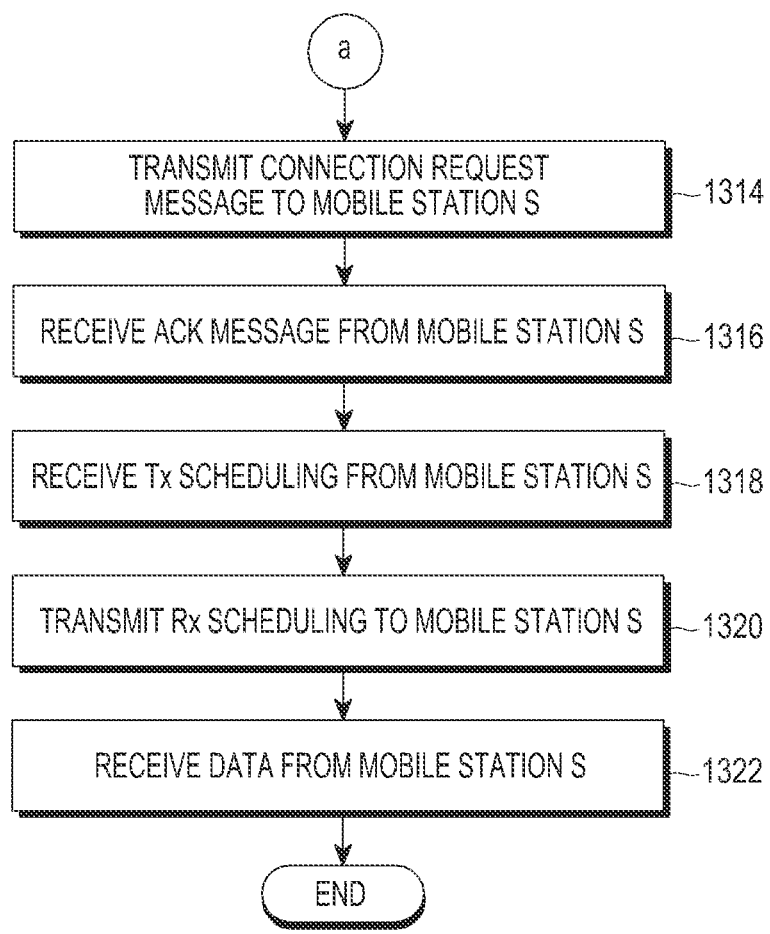

FIGS. 13A and 13B are flowcharts illustrating operations of mobile station D according to the third embodiment of the present disclosure.

Referring to FIG. 13, in operation 1302, mobile station D (200) stands ready for reception of the information message for an interval configured in advance using frequency band f3 (130).

When it is determined in operation 1304 that the information message has not been received, mobile station D (200) changes the frequency band from f3 (130) to f1 (110) in operation 1306. Mobile station D (200) stands ready for the reception of the information message in f1 (110) for an interval configured in advance.

When it is determined in operation 1308 that the information message has not been received from mobile station S (100), mobile station D (200) changes the frequency band from f1 (110) to f3 (130) in operation 1310. Mobile station D (200) stands ready for the reception of the information message in f3 (130) for an interval configured in advance.

Mobile station D (200) receives the information message from mobile station S (100) in operation 1312. Accordingly, in operation 1314, mobile station D (200) transmits, to mobile station S (100), the connection request message in response to the information message. The connection request message may include information representing that the D2D communication is to be performed in f3 (130) through which the information message has been received.

Mobile station D (200) receives the acknowledgement message for the connection request message from mobile station S (100) in operation 1316.

Thereafter, mobile station S (100) and mobile station D (200) perform Tx scheduling and Rx scheduling, respectively, in operations 1318 and 1320, and mobile station D (200) receives data from mobile station S (100) in operation 1322.

Figure 14:
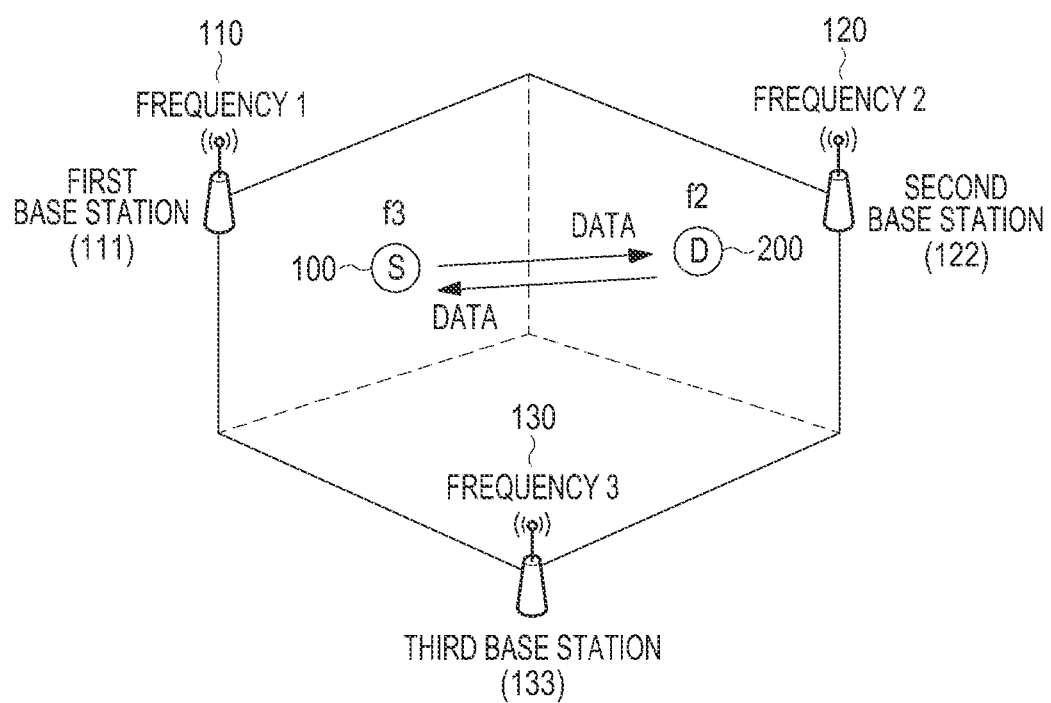
FIG. 14 illustrates a configuration of a wireless communication system according to a fourth embodiment of the present disclosure.

FIG. 14 illustrates a configuration of a wireless communication system according to a fourth embodiment of the present disclosure.

Referring to FIG. 14, mobile station S (100) is allocated some resources in frequency band f1 (110) used by the first base station 111. Thereafter, mobile station S (100) transmits an information message containing interference information thereof by using the allocated resources. The information message has a smaller size relative to general data. Accordingly, the base station does not suffer significant degradation of a cellular network due to the resource allocation.

Mobile station D (200) having received the information message transmits a connection request message to mobile station S (100). At this time, mobile station S (100) and mobile station D (200) may differently configure a frequency band to be used by mobile station S (100) for data transmission and a frequency band to be used by mobile station D (200) for data transmission, according to frequency band situations. The frequency bands to be used for the data transmission are differently configured and illustrated. However, the present disclosure should not be limited thereto.

Figure 15:
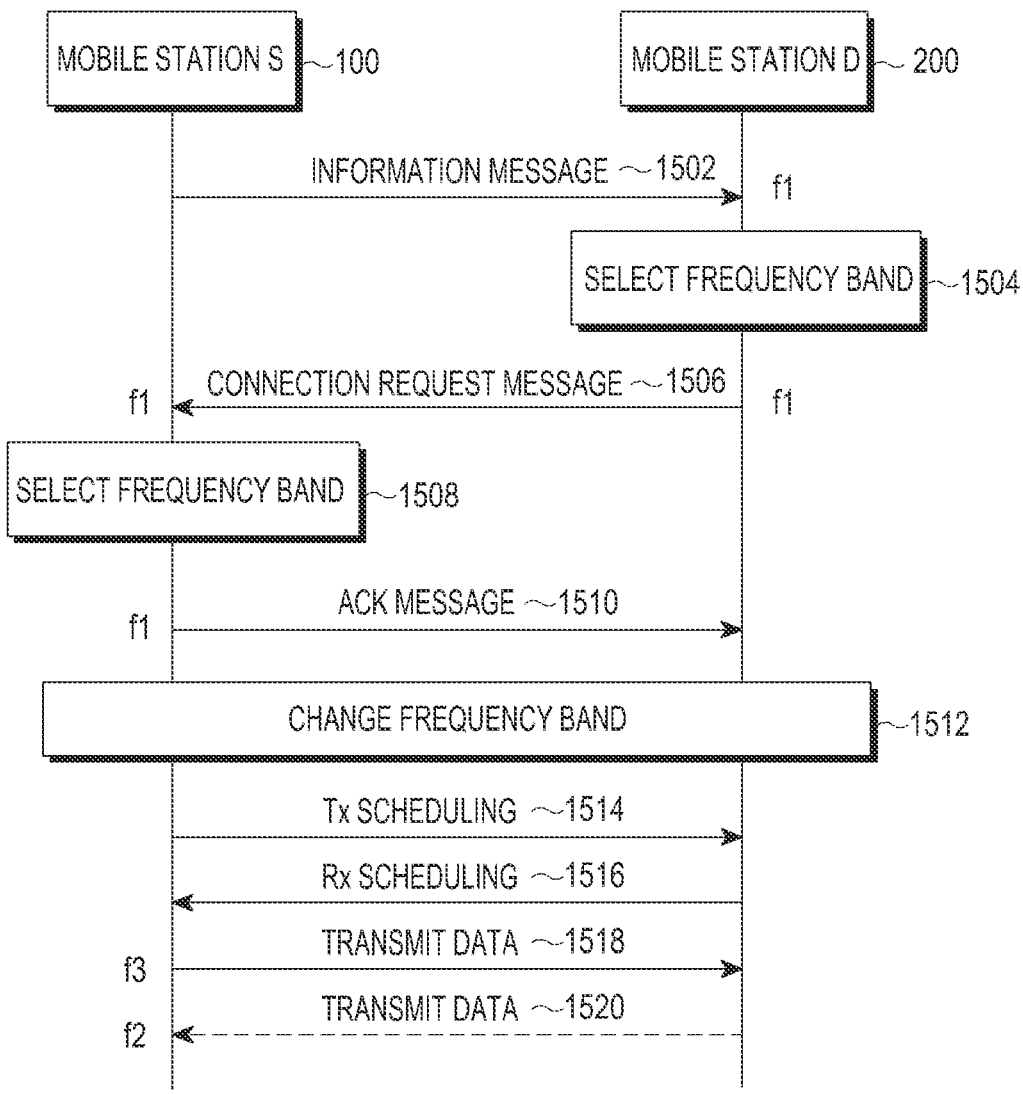
FIG. 15 is a signal flow diagram of a wireless communication system according to the fourth embodiment of the present disclosure.

FIG. 15 is a signal flow diagram of the wireless communication system according to the fourth embodiment of the present disclosure.

Referring to FIG. 15, mobile station S (100) transmits an information message using f1 (110) in operation 1502. The information message may include frequency band information that can be used by mobile station S (100), an interference level for each of frequency bands, a use frequency of a frequency band, the number of mobile stations using a frequency band, and the like. Namely, the information message includes information representing that mobile station S (100) has to use f2 (120) and f3 (130) and not f1 (110).

Mobile station D (200) stands ready for reception for an interval configured in advance in f3 (130) among a plurality of frequency bands. Thereafter, mobile station D (200) receives the information message from mobile station S (100) for an interval configured in advance. In operation 1504, mobile station D (200) considers frequency interference and a band usage frequency thereof based on the information message. Namely, in operation 1504, mobile station D (200) determines that the frequency band which mobile station S (100) has to use for data transmission is f3 (130), and selects f3 (130).

In operation 1506, mobile station D (200) transmits, to mobile station S (100), a connection request message containing the information for requesting to perform communication using f3 (130).

When receiving the connection request message, mobile station S (100) determines that the frequency band which mobile station D (200) has to use for the data transmission is f2 (120) and selects frequency band f2 (120) based on information of the connection request message in operation 1508.

In operation 1510, mobile station S (100) transmits, to mobile station D (200), an acknowledgement message including information on the frequency band to be used by mobile station S (100) for the data transmission and information on the frequency band to be used by mobile station D (200) for the data transmission. The acknowledgement message may include reception ACK information for the connection request message and frequency usage information. Furthermore, the acknowledgement message also includes information for notifying of a starting time point of D2D communication in the frequency band.

Accordingly, mobile station S (100) and mobile station D (200) change the frequency band to the corresponding frequency band according to the starting time point of the D2D communication in operation 1512.

Thereafter, mobile station S (100) and mobile station D (200) perform Tx scheduling and Rx scheduling, respectively, in operations 1514 and 1516. The performing of the Tx scheduling and the Rx scheduling represents performing scheduling for time points when mobile station S (100) and mobile station D (200) will transmit data, respectively.

In operations 1518 and 1520, mobile station S (100) and mobile station D (200) perform the D2D communication at the scheduled time point for data transmission.

Figure 16:
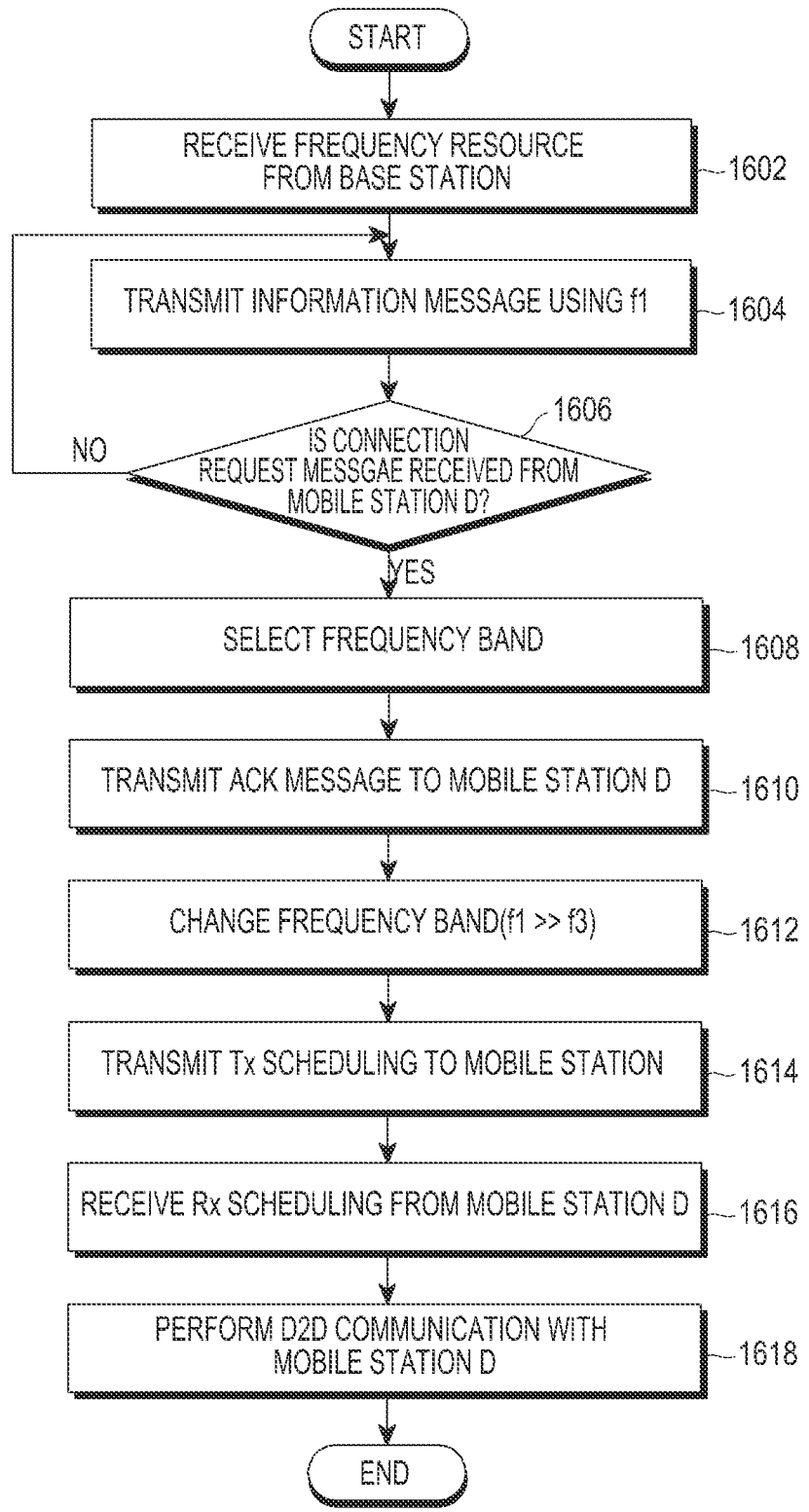
FIG. 16 is a flowchart illustrating operations of mobile station S according to the fourth embodiment of the present disclosure.

FIG. 16 is a flowchart illustrating operations of mobile station S according to the fourth embodiment of the present disclosure.

Referring to FIG. 16, mobile station S (100) is allocated frequency resources from the most contiguous base station in operation 1602. Namely, mobile station S (100) is allocated some resources in frequency band f1 (110) used by the base station.

Mobile station S (100) transmits the information message using the frequency resources allocated from the base station in operation 1604.

Although not illustrated in FIG. 16, mobile station S (100) may continuously transmit the information message using the frequency resources allocated from f1 (110) until mobile station D (200) receives the information message.

When it is determined in operation 1606 that the connection request message has been received from mobile station D (200), mobile station S (100) determines that the frequency band which mobile station D (200) has to use for the data transmission is f2 (120) and selects frequency band f2 (120), based on information of the connection request message in operation 1608.

In operation 1610, mobile station S (100) transmits to mobile station D (200) the acknowledgement message including information on the frequency band to be used by mobile station S (100) for the data transmission and information on the frequency band to be used by mobile station D (200) for the data transmission. The acknowledgement message may include reception ACK information for the connection request message and frequency usage information. Furthermore, the acknowledgement message also includes information for notifying a starting time point of D2D communication in the frequency band.

Accordingly, mobile station S (100) changes the frequency band to the corresponding frequency band according to the starting time point of the D2D communication in operation 1612.

Thereafter, mobile station S (100) performs Tx scheduling and Rx scheduling in operations 1614 and 1616. The performing of the Tx scheduling and the Rx scheduling represents performing scheduling for time points when mobile station S (100) and mobile station D (200) will transmit data, respectively.

In operation 1618, mobile station S (100) performs the D2D communication at the time point when the data transmission is scheduled.

Figure 17:
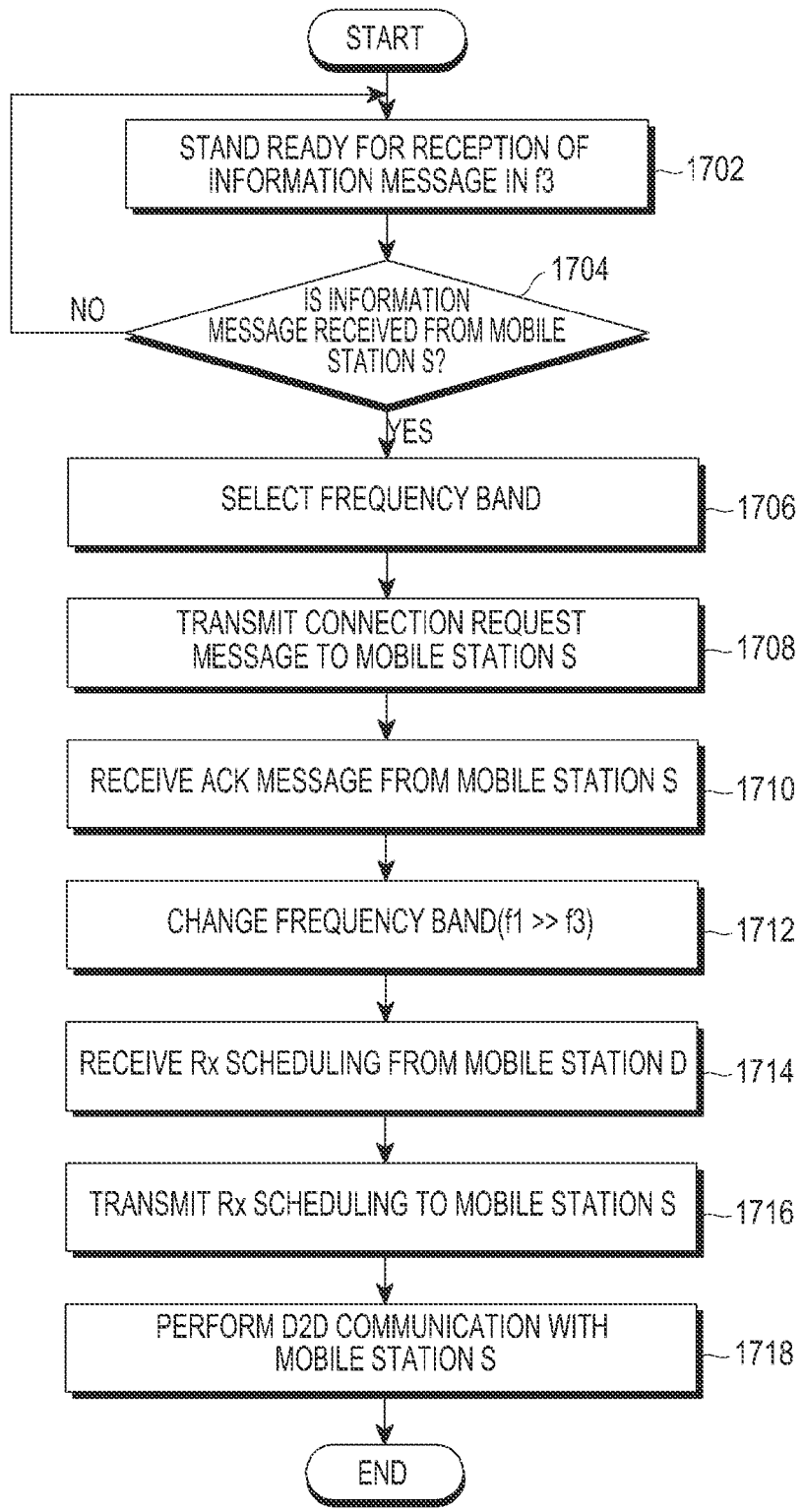
FIG. 17 is a flowchart illustrating operations of mobile station D according to the fourth embodiment of the present disclosure.

FIG. 17 is a flowchart illustrating operations of mobile station D according to the fourth embodiment of the present disclosure.

Referring to FIG. 17, mobile station D (200) stands ready for reception for an interval configured in advance using frequency band f1 (110) among a plurality of frequency bands in operation 1702.

Thereafter, when it is determined in operation 1704 that the information message has been received from mobile station S (100) for the interval configured in advance, mobile station D (200) considers frequency interference and band usage frequency thereof based on the information message. Namely, in operation 1706, mobile station D (200) determines that the frequency band which mobile station S (100) has to use for data transmission is f3 (130), and selects f3 (130).

In operation 1708, mobile station D (200) transmits, to mobile station S (100), the connection request message containing information for requesting to perform communication by using f3 (130).

In operation 1710, mobile station D (200) receives, from mobile station S (100), the acknowledgement message including information on the frequency band to be used by mobile station S (100) for the data transmission and information on the frequency band to be used by mobile station D (200) for the data transmission. The acknowledgement message may include reception ACK information for the connection request message and frequency usage information. Furthermore, the acknowledgement message also includes information for notifying a starting time point of D2D communication in the frequency band.

Accordingly, mobile station S (200) changes the frequency band to the corresponding frequency band according to the starting time point of the D2D communication in operation 1712.

Thereafter, mobile station D (200) performs Tx scheduling and Rx scheduling in operations 1714 and 1716. The performing of the Tx scheduling and the Rx scheduling represents performing scheduling for time points when mobile station S (100) and mobile station D (200) will transmit data, respectively.

In operation 1718, mobile station S (200) performs the D2D communication at the time point when the data transmission is scheduled.

Figure 18:
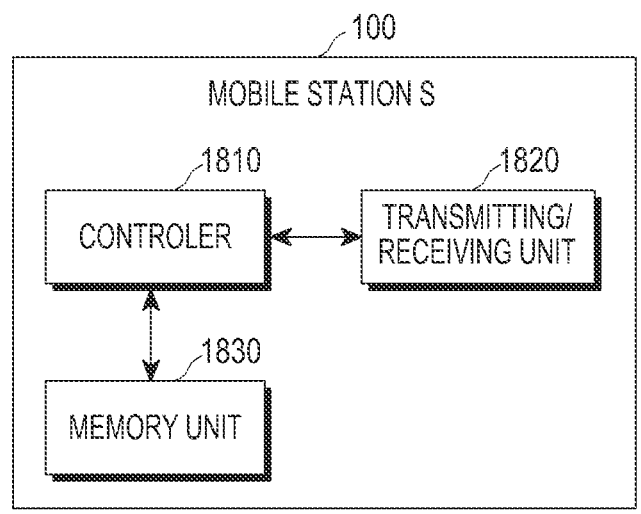
FIG. 18 is a block diagram of mobile station S according to an embodiment of the present disclosure.

FIG. 18 is a block diagram of mobile station S according to an embodiment of the present disclosure.

Referring to FIG. 18, mobile station S (100) includes a controller 1810, a transmitting/receiving unit 1820, and a memory unit 1830.

The controller 1810 generates a message containing information such as frequency band information that can be used by mobile station S (100), an interference level for each of frequency bands, a use frequency of a frequency band, the number of mobile stations using a frequency band, and the like. Furthermore, the controller 1810 selects and changes a frequency band. In addition, the controller 1810 controls the transmitting/receiving unit 1820 and the memory unit 1830, and controls an overall operation of mobile station S (100).

The transmitting/receiving unit 1820 transmits the message generated by the controller 1810, and transmits/receives data to/from a mobile station performing D2D communication.

When receiving a message from the mobile station performing the D2D communication, the memory unit 1830 stores information of the message.

Figure 19:
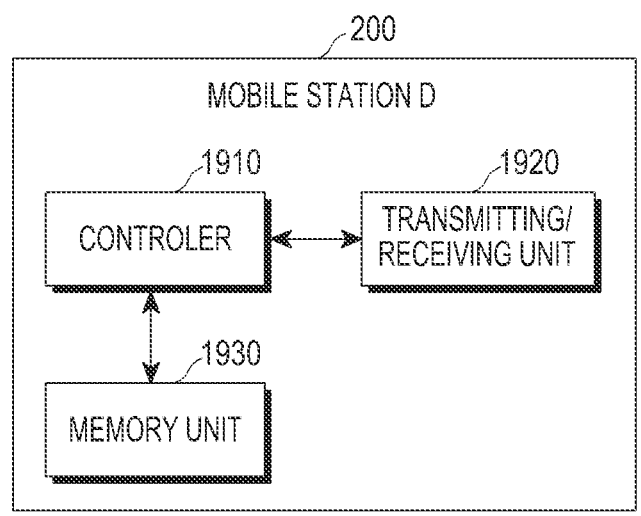
FIG. 19 is a block diagram of mobile station D according to an embodiment of the present disclosure.

FIG. 19 is a block diagram of mobile station D according to an embodiment of the present disclosure.

Referring to FIG. 19, mobile station D (200) includes a controller 1910, a transmitting/receiving unit 1920, and a memory unit 1930.

The controller 1910 generates a message containing information such as frequency band information that can be used by mobile station D (100), an interference level for each of frequency bands, a use frequency of a frequency band, the number of mobile stations using a frequency band, and the like. Furthermore, the controller 1910 selects and changes a frequency band. In addition, the controller 1910 controls the transmitting/receiving unit 1920 and the memory unit 1930, and controls an overall operation of mobile station D (200).

The transmitting/receiving unit 1920 transmits the message generated by the controller 1910, and transmits/receives data to/from a mobile station performing D2D communication.

When receiving a message from the mobile station performing the D2D communication, the memory unit 1930 stores information of the message.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting/receiving, by a first mobile station, data through device to device (D2D) communication with a second mobile station in a wireless communication system, the method comprising:

sequentially selecting remaining frequency bands other than a frequency band used within a cell in which the first mobile station is located, from among all the frequency bands for the D2D communication;

transmitting information on some frequency resources allocated from the selected frequency bands to the second mobile station;

receiving information on a counterpart-frequency band selected for the D2D communication from the second mobile station;

determining transmission and reception frequency bands to be used for the D2D communication based on the information on the self-frequency band and the information on the counterpart-frequency band;

transmitting data to the second mobile station in the determined transmission frequency band; and receiving data from the second mobile station in the determined reception frequency band, wherein an interval for transmitting the information is configured to be an integer number of times or 1/n times of an interval in which the second mobile station monitors reception of a signal transmitted by itself in one frequency band, wherein n is a positive integer.

2. A method of transmitting, by a first mobile station, data through device to device (D2D) communication with a second mobile station in a wireless communication system, the method comprising:

receiving information on a counterpart-frequency band selected from all frequency bands for the D2D communication from the second mobile station;

selecting a self-frequency band to be used by the first mobile station for the D2D communication, based on the received information of the counterpart-frequency band;

transmitting information on the selected self-frequency band to the second mobile station;

determining transmission frequency bands and reception frequency bands to be used for the D2D communication, based on the information on the counterpart-frequency band and the information on the self-frequency band;

transmitting data to the second mobile station in the determined transmission frequency band; and receiving data from the second mobile station in the determined reception frequency band, wherein the information on the counterpart-frequency band is received by sequentially selecting remaining frequency bands other than a frequency band used within a cell in which the second mobile station is located, from among all the frequency bands for the D2D communication, and wherein an interval for receiving information on the counterpart-frequency band from the second mobile station in the selected frequency band is an integer number of times or 1/n times of an interval in which the second mobile station transmits a signal in one frequency band, wherein n is a positive integer.

3. A first mobile station for transmitting data through device to device (D2D) communication with a second mobile station in a wireless communication system, the first mobile station comprising:

a transmitting unit configured to:
sequentially select remaining frequency bands other than a frequency band used within a cell in which the first mobile station is located, from among all the frequency bands for the D2D communication, and transmit information on some frequency resources allocated from the selected frequency bands to the second mobile station;

a receiving unit configured to receive information on a counterpart-frequency band selected by the second mobile station for the D2D communication and data from the second mobile station in a reception frequency band; and a controller configured to:
select the self-frequency band from all frequency bands for the D2D communication and
determine the transmission frequency band and the reception frequency band which are to be used for the D2D communication, based on the information on the self-frequency band and the information on the counterpart-frequency band, wherein an interval for transmitting the information is configured to be an integer number of times or 1/n times of an interval in which the second mobile station monitors reception of a signal transmitted by itself in one frequency band, wherein n is a positive integer.

4. A first mobile station for transmitting data through device to device (D2D) communication with a second mobile station in a wireless communication system, the first mobile station comprising:

a transmission unit configured to transmit information on a self-frequency band to the second mobile station and data to the second mobile station in a transmission frequency band;

a receiving unit configured to receive information on a counterpart-frequency band selected by the second mobile station for the D2D communication and data from the second mobile station in a reception frequency band; and a controller configured to
select the self-frequency band from all frequency bands for the D2D communication based on the received information on the counterpart-frequency band, and
determine transmission and reception frequency bands to be used for the D2D communication, based on the information on the counterpart-frequency band and the information on the self-frequency band, wherein the information on the counterpart-frequency band is received by sequentially selecting remaining frequency bands other than a frequency band used within a cell in which the second mobile station is located, from among all the frequency bands for the D2D communication, and wherein an interval for receiving information on the counterpart-frequency band from the second mobile station in the selected frequency band is an integer number of times or 1/n times of an interval in which the second mobile station transmits a signal in one frequency band, wherein n is a positive integer.

* * * * *